(12) United States Patent
Honda et al.

(10) Patent No.: US 9,728,985 B2
(45) Date of Patent: Aug. 8, 2017

(54) CHARGING DEVICE AND CHARGING METHOD FOR CHARGING A PLURALITY OF SECONDARY BATTERY-EQUIPPED DEVICES

(71) Applicant: Panasonic Corporation, Osaka (JP)

(72) Inventors: Kazuyoshi Honda, Osaka (JP); Yoshikazu Yamaoka, Gifu (JP); Kensuke Nakura, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 304 days.

(21) Appl. No.: 14/666,637

(22) Filed: Mar. 24, 2015

(65) Prior Publication Data
US 2015/0295433 A1   Oct. 15, 2015

(30) Foreign Application Priority Data
Apr. 11, 2014   (JP) .................................. 2014-082233

(51) Int. Cl.
*H01M 10/44*   (2006.01)
*H01M 10/46*   (2006.01)
*H02J 7/00*   (2006.01)

(52) U.S. Cl.
CPC .......... *H02J 7/0027* (2013.01); *H02J 7/0013* (2013.01)

(58) Field of Classification Search
CPC ....... H02J 7/0016; H02J 7/0018; H02J 7/0019
USPC ................. 320/107, 116, 118, 119, 121, 122
See application file for complete search history.

(56) References Cited

U.S. PATENT DOCUMENTS

| | | | |
|---|---|---|---|
| 8,120,203 B2 * | 2/2012 | Heineman | H02J 1/08 307/32 |
| 2001/0010456 A1 | 8/2001 | Kaite et al. | |
| 2010/0253278 A1 * | 10/2010 | Chang | B60K 16/00 320/101 |
| 2013/0200860 A1 * | 8/2013 | Takeda | H02J 7/0024 320/167 |

FOREIGN PATENT DOCUMENTS

| | | |
|---|---|---|
| JP | 4-123771 | 4/1992 |
| JP | 6-290814 | 10/1994 |
| JP | 8-237877 | 9/1996 |

(Continued)

*Primary Examiner* — Edward Tso
(74) *Attorney, Agent, or Firm* — McDermott Will & Emery LLP

(57) ABSTRACT

A charging device of an aspect of the present disclosure includes couplers and control circuitry that controls a charging operation. If the number of one or more secondary battery-equipped devices to be charged is smaller than a set number, the control circuitry charges each of the one or more secondary battery-equipped devices to be charged with a continuous current. If the number is greater than or equal to the set number, the control circuitry intermittently repeats charging of each of the one or more secondary battery-equipped devices to be charged with a stopping interval placed between charging operations while selectively and sequentially switching the one or more secondary battery-equipped devices to which a charging current is supplied at the same time, and the control circuitry increases the charging current and shortens an application duration of the charging current per charging with an increase in the number of secondary battery-equipped devices to be charged.

20 Claims, 10 Drawing Sheets

(56) References Cited

FOREIGN PATENT DOCUMENTS

| | | |
|---|---|---|
| JP | 11-185161 | 7/1999 |
| JP | 11-285159 | 10/1999 |
| JP | 2001-211558 | 8/2001 |
| JP | 2003-199260 | 7/2003 |
| JP | 2012-239331 | 12/2012 |

* cited by examiner

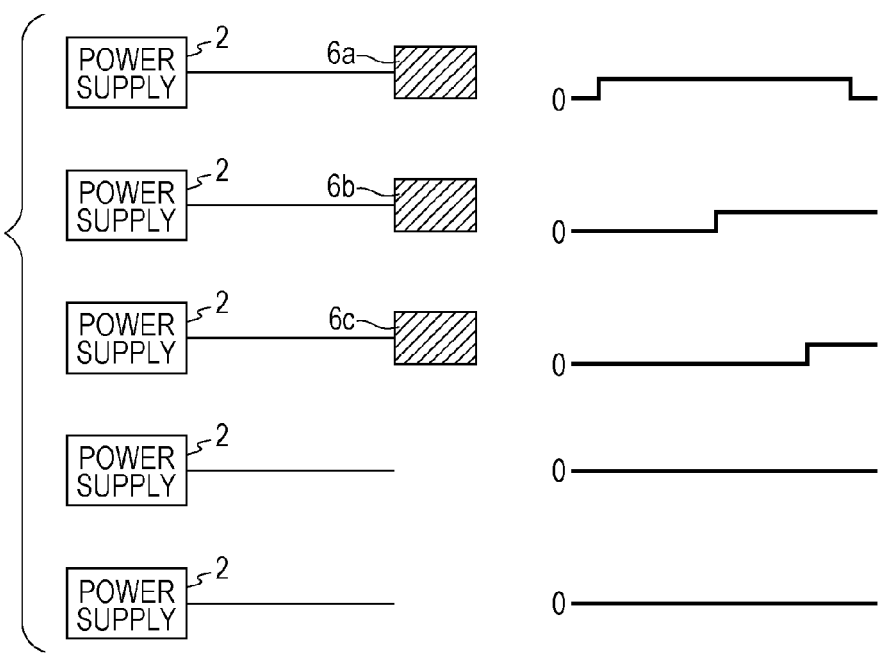

CHARGING DEVICE AND CHARGING METHOD FOR CHARGING A PLURALITY OF SECONDARY BATTERY-EQUIPPED DEVICES

BACKGROUND

1. Technical Field

The present disclosure relates to a charging device that can charge a plurality of secondary battery-equipped devices and a method for charging the plurality of secondary battery-equipped devices.

2. Description of the Related Art

At the time of practical application of a secondary battery-equipped device, shared use of charging equipment is required. In particular, shared use of charging equipment produces a great benefit for a mobile device equipped with a secondary battery. Such secondary battery-equipped devices are, for example, a mobile terminal and a vehicle.

Various charging methods in the charging equipment have been proposed. In Japanese Unexamined Patent Application Publication No. 8-237877, a method by which a plurality of battery units included in a secondary battery are charged with a pulse current has been disclosed. In Japanese Unexamined Patent Application Publication No. 11-185161, a method by which a plurality of batteries are pulse charged by performing time-division switching of batteries charged with a power supply has been disclosed.

SUMMARY

When a plurality of secondary battery-equipped devices share one charging device, these devices are required to be charged in a shorter time at high capacity.

One non-limiting and exemplary embodiment provides a charging device and a charging method by which a plurality of secondary battery-equipped devices are charged in a short time at high capacity.

A charging device according to one aspect of the present disclosure includes: a plurality of couplers that are respectively connectable to a plurality of secondary battery-equipped devices; and control circuitry operative to: charge, if the number of one or more secondary battery-equipped devices to be charged is smaller than a set number, each of the one or more secondary battery-equipped devices to be charged with a continuous current, wherein the one or more secondary battery-equipped devices to be charged are respectively connected to one or more couplers of the plurality of couplers; and intermittently repeat, if the number of the one or more secondary battery-equipped devices to be charged is greater than or equal to the set number, charging of each of the one or more secondary battery-equipped devices to be charged with a stopping interval placed between charging operations while selectively and sequentially switching the one or more secondary battery-equipped devices to which a charging current is supplied at the same time, wherein the charging current is increased and an application duration of the charging current per charging is shortened with an increase in the number of the one or more secondary battery-equipped devices to be charged.

According to an aspect of the present disclosure, it is possible to charge a plurality of secondary battery-equipped devices in a short time at high capacity.

It should be noted that comprehensive or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 18 is a schematic diagram illustrating a process of a charging method in an existing charging device.

DETAILED DESCRIPTION

[Underlying Knowledge Forming Basis of the Present Disclosure]

The following is the underlying knowledge forming the basis of the present disclosure.

Figure 2:
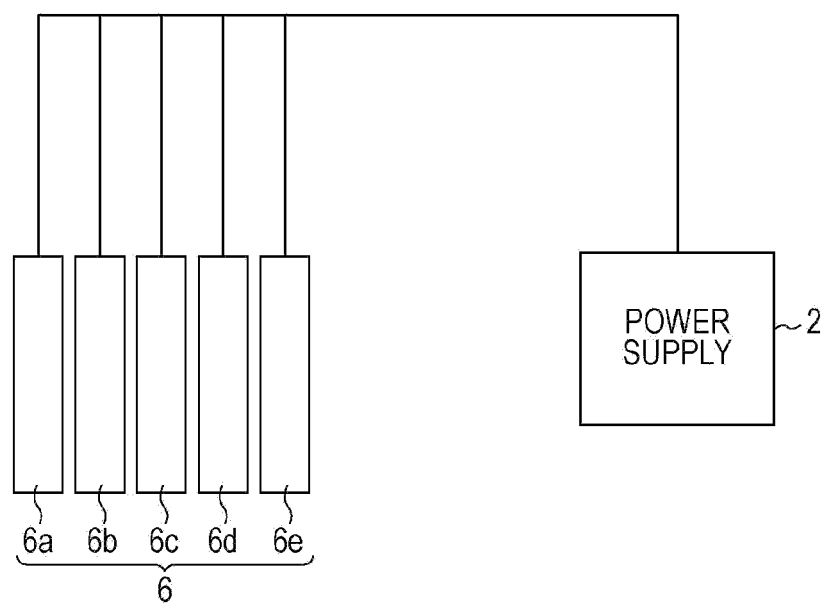
FIG. 2 is a schematic diagram depicting an example of a charging method of Reference Example 1.

FIG. 2 depicts a charging method of Reference Example 1. In the charging method of Reference Example 1, a plurality of secondary battery-equipped devices 6 connected in parallel are charged with electric power from a power supply 2. In this method, even when a plurality of secondary battery-equipped devices are equipped with secondary batteries having different specifications, the secondary battery-equipped devices are charged under the same charging voltage condition. Therefore, sometimes a charging voltage matches some secondary battery-equipped devices but does not match other secondary battery-equipped devices. If the voltage between the terminals of the secondary batteries becomes too high, the batteries are rapidly deteriorated due to, for example, electrolyte decomposition and the battery capacity is decreased. On the other hand, if the voltage is too low, sufficient charging is not performed, making it impossible to obtain sufficient charging capacity.

Figure 3:
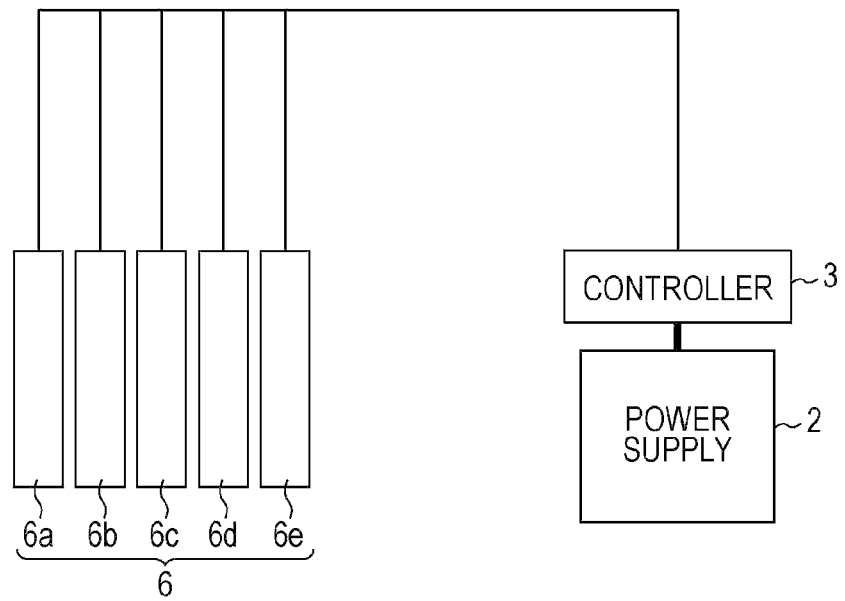
FIG. 3 is a schematic diagram depicting an example of a charging method of Reference Example 2.

FIG. 3 depicts a charging method of Reference Example 2. In the charging method of Reference Example 2, a common controller 3 is provided between a plurality of secondary battery-equipped devices 6 and a power supply 2. The controller 3 monitors the voltage of each of the secondary battery-equipped devices 6a to 6e and stops charging when the voltage value becomes a predetermined value or more. This suppresses an overvoltage. However, if the plurality of secondary battery-equipped devices 6 have different charging voltages, the controller 3 cannot charge the secondary battery-equipped devices 6 under an optimum condition.

Figure 4:
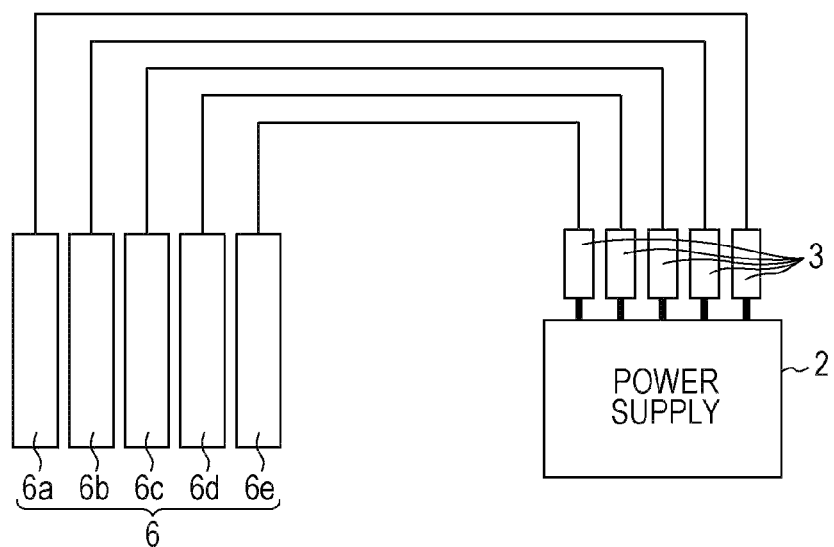
FIG. 4 is a schematic diagram depicting an example of a charging method of Reference Example 3.

FIG. 4 depicts a charging method of Reference Example 3. In the charging method of Reference Example 3, a plurality of controllers 3 are provided for a plurality of secondary battery-equipped devices 6. The plurality of controllers 3 respectively monitor the voltages of the secondary battery-equipped devices 6a to 6e. This method makes it possible to perform charging suitable for each of the secondary battery-equipped devices 6. However, device cost becomes high.

A charging method of Reference Example 4 by which, unlike Reference Examples 1 to 3, a plurality of secondary battery-equipped devices are charged one at a time is possible. In this case, devices of the plurality of secondary battery-equipped devices, the devices being connected to a power supply, are sequentially switched. This method makes it possible to fully charge the secondary batteries of all the secondary battery-equipped devices more reliably while reducing device cost. In the past, it has been known that a charging current value has to be limited to a lower value in order to fully charge the secondary batteries. Therefore, if the plurality of secondary battery-equipped devices are sequentially charged with a low charging current in the charging method of Reference Example 4, this excessively lengthens the time required for charging.

As described above, it is difficult to fully charge the secondary batteries in the plurality of secondary battery-equipped devices in a short time with a simple device.

On the other hand, the inventors have found out that sufficient charging capacity can be obtained by making a charging current higher than a current in continuous constant current charging, shortening the charging current supply time per charging, and repeating charging intermittently with a stopping interval placed between charging operations. The inventors performed the above-described charging method by using a pulse current having a magnitude that would decrease the charging capacity if it was a continuous current. The results revealed that the full charging capacity obtained when intermittent charging was performed by using a large pulse current was almost equal to the full charging capacity obtained when continuous constant current charging was performed by using a small continuous current. The details of this verification will be described later.

On the other hand, with the charging method described above, since charging using a high current is repeated, there is a possibility that the durability of a charging device is reduced due to, for example, switching between connections of a plurality of secondary battery-equipped devices. When charging equipment is operated for a long period, suppression of deterioration of the charging equipment and improvement in the reliability and durability thereof are required.

Based on these studies, the inventors have found out a charging method by which continuous constant current charging is performed by using a low current when the number of secondary battery-equipped devices to be charged is small and intermittent charging is performed by using a high pulsed current when the number of secondary battery-equipped devices to be charged is large, and thus arrived at the present disclosure.

An aspect of the present disclosure is based on the above-described findings and is directed to a charging device for embodying a charging method that does not lie in the existing concept. The overview of the aspect of the present disclosure is as follows.

Overview of Embodiments

A charging device which is an aspect of the present disclosure includes:
a plurality of couplers that are respectively connectable to a plurality of secondary battery-equipped device; and control circuitry operative to: charge, if the number of one or more secondary battery-equipped devices to be charged is smaller than a set number, each of the one or more secondary battery-equipped devices to be charged with a continuous current, wherein the one or more secondary battery-equipped devices to be charged are respectively connected to one or more couplers of the plurality of couplers; and intermittently repeat, if the number of one or more secondary battery-equipped devices to be charged is greater than or equal to the set number, charging of each of the secondary battery-equipped devices to be charged with a stopping interval placed between charging operations while selectively and sequentially switching the one or more secondary battery-equipped devices to which a charging current is supplied at the same time, wherein the charging current is increased and an application duration of the charging current per charging is shortened with an increase in the number of secondary battery-equipped devices to be charged.

With this configuration, when the number of secondary battery-equipped devices to be charged is small, charging thereof is performed by using a continuous current, and, when the number of secondary battery-equipped devices to be charged is large, the secondary battery-equipped devices are intermittently charged with a charging current which is applied with a stopping interval placed between charging operations. As a result, even when the number of secondary battery-equipped devices to be charged is large, the charging device can charge the secondary battery-equipped devices in a short time with a simple configuration. Moreover, when the number of secondary battery-equipped devices to be charged is small, the burden on the charging device can be reduced and a reduction in the durability of the charging device can be suppressed.

For example, the set number may be 2, and, if the number of the one or more secondary battery-equipped devices to be charged is 2 or more, one secondary battery-equipped device is being charged while the other secondary battery-equipped device may be in the stopping interval. For example, the charging device may perform a charging operation based on electric power which is supplied from a single power supply.

For example, if the number of one or more secondary battery-equipped devices to be charged is greater than or equal to the set number, the control circuitry may lengthen the stopping interval with an increase in the number of secondary battery-equipped devices to be charged.

For example, the control circuitry may keep the time average of the charging current expressed as I×TC/(TC+TP) constant irrespective of an increase in the number of secondary battery-equipped devices to be charged, where TC is the application duration of the charging current, I is the magnitude of the charging current, and TP is the stopping interval.

For example, the time average of the charging current may be equal to the continuous current.

For example, if the number of secondary battery-equipped devices to be charged is increased during the application duration, the control circuitry may increase the charging current and shorten the application duration before the application duration is ended.

For example, the control circuitry may keep the amount of charging electricity or the amount of charging electric power per charging constant in each of the one or more secondary battery-equipped devices to be charged irrespective of the number of secondary battery-equipped devices to be charged. Incidentally, the amount of charging electricity corresponds to the area of the time waveform of the charging current, for example.

For example, the control circuitry may make the secondary battery-equipped devices to be charged equal to each other in at least one of the magnitude of the charging current and the application duration of the charging current per charging.

For example, the control circuitry may make the application duration of the charging current per charging longer for the secondary battery-equipped device to be charged with higher full charging capacity.

For example, the plurality of couplers may each include wireless power feeder.

For example, the charging device may further include an information acquirer that acquires information on a secondary battery from each of the secondary battery-equipped devices to be charged and sends the information to the control circuitry, and the control circuitry may determine a charging condition based on the information.

For example, the charging device may further include an electricity storage device operative to: be charged when the number of secondary battery-equipped devices to be charged is smaller than the number of the plurality of couplers; and supply power when the number of secondary battery-equipped devices to be charged is 2 or more.

A charging method which is an aspect of the present disclosure includes: (a) detecting the number of one or more secondary battery-equipped devices to be charged; (b) charging, if the number of one or more secondary battery-equipped devices to be charged is smaller than a set number, each of the one or more secondary battery-equipped devices to be charged with a continuous current; and (c) intermittently repeating, if the number of one or more secondary battery-equipped devices to be charged is greater than or equal to the set number, charging of each of the secondary battery-equipped devices to be charged with a stopping interval placed between charging operations while selectively and sequentially switching the one or more secondary battery-equipped devices to which a charging current is supplied at the same time, wherein in the step (c), if an increase in the number of secondary battery-equipped devices to be charged is further detected, the charging current is increased and an application duration of the charging current per charging is shortened.

With this method, when the number of secondary battery-equipped devices to be charged is small, charging thereof is performed by using a continuous current, and, when the number of secondary battery-equipped devices to be charged is large, the secondary battery-equipped devices are intermittently charged with a charging current which is applied with a stopping interval placed between charging operations. As a result, even when the number of secondary battery-equipped devices to be charged is large, the secondary battery-equipped devices can be charged in a short time. Moreover, when the number of secondary battery-equipped devices to be charged is small, the burden of switching the supply of the charging current can be reduced.

For example, the set number may be 2.

For example, in the step (c), the stopping interval may be increased with an increase in the number of secondary battery-equipped devices to be charged.

For example, the time average of the charging current expressed as I×TC/(TC+TP) may be kept constant irrespective of an increase in the number of secondary battery-equipped devices to be charged, where TC is the application duration of the charging current, I is the magnitude of the charging current, and TP is the stopping interval.

For example, in the step (c), if an increase in the number of secondary battery-equipped devices to be charged is detected during the application duration, the charging current may be increased and the application duration may be shortened before the application duration is ended.

For example, the amount of charging electricity or the amount of charging electric power per charging may be kept constant in each of the secondary battery-equipped devices to be charged irrespective of the number of secondary battery-equipped devices to be charged.

For example, the secondary battery-equipped devices to be charged may be made equal to each other in at least one of the magnitude of the charging current and the application duration of the charging current per charging.

For example, the application duration of the charging current per charging may be made longer for the secondary battery-equipped device to be charged with higher full charging capacity.

Embodiment

Hereinafter, with reference to the drawings, a charging device and a charging method of an embodiment of the present disclosure will be described in detail. It is to be noted that the following embodiment is a mere example and the present disclosure is not limited to the following embodiment. Moreover, in the following embodiment, the same members are identified with the same characters, and overlapping explanations will be sometimes omitted.

[Charging Device]

Figure 1:
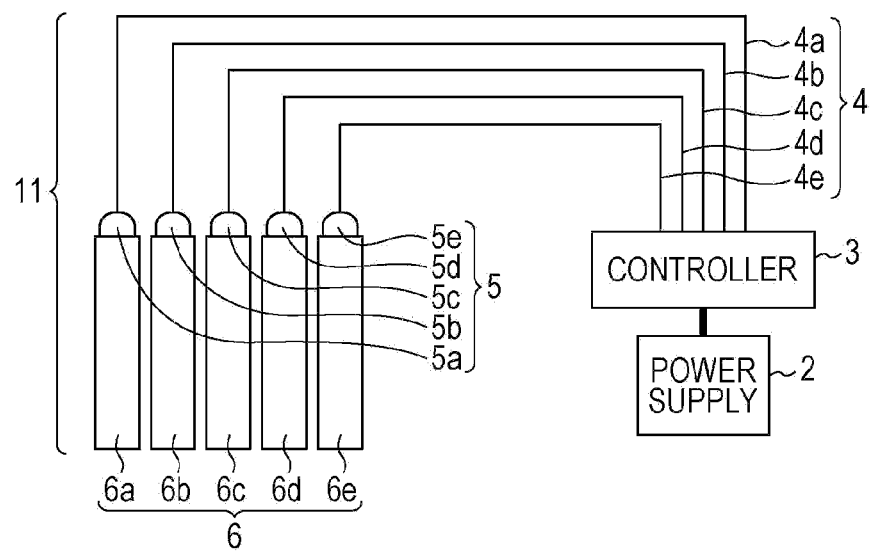
FIG. 1 is a schematic diagram depicting a configuration example of a charging device.

FIG. 1 is a schematic diagram depicting a configuration example of a charging device according to an embodiment of the present disclosure. A charging device 11 depicted in FIG. 1 includes a plurality of couplers 5, a controller 3, and a plurality of power transmission lines 4. The charging device 11 is capable of receiving electric power from a power supply 2 and charging a plurality of secondary battery-equipped devices 6 connected to the couplers 5. The power supply 2 may be placed outside the charging device 11. Each of the plurality of couplers 5 is connectable to the secondary battery-equipped device 6. "Being connectable to the secondary battery-equipped device" may simply refer to a state in which the charging device 11 can supply a current to a secondary battery-equipped device 6 connected to a coupler 5 via the coupler 5. That is, "being connectable to the secondary battery-equipped device" includes various configurations such as a configuration in which connection is established by wireless power feeding, in addition to a configuration in which the coupler 5 and the secondary battery-equipped device 6 are brought into direct contact with each other. In FIG. 1, five couplers 5a to 5e are illustrated; however, the number of couplers 5 is not limited to a particular number. For example, if there are n couplers 5, it is possible to connect up to n secondary battery-equipped devices 6 to the charging device 11 at the same time. In this example, the secondary battery-equipped devices 6a to 6e are depicted respectively for the five couplers 5a to 5e. Incidentally, the number of secondary battery-equipped devices 6 which are connected to the couplers 5 is not limited to a particular number and simply has to be the maximum number n of connections (here, the number of couplers 5) or less.

Each secondary battery-equipped device 6 is equipped with a secondary battery. The secondary battery includes a positive electrode including a positive-electrode active material layer, a negative electrode including a negative-electrode active material layer, and an electrolyte placed between the positive electrode and the negative electrode. The positive-electrode active material layer contains a positive-electrode active material. Some examples of the positive-electrode active material include a lithium cobalt oxide or a lithium combined metal oxide. The lithium combined metal oxide contains, for example, cobalt, nickel, and manganese. The positive-electrode active material layer may contain a conductive aid, and/or a binder if necessary. The negative-electrode active material layer contains a negative-electrode active material such as graphite, lithium, or silicon. The negative-electrode active material layer may contain a conductive aid, and/or a binder if necessary. The electrolyte may be, for example, an electrolytic solution obtained by dissolving electrolytic salt in a solvent or a solid electrolyte. If the electrolyte contains an electrolytic solution, the secondary battery may include a separator formed of a porous film, or a nonwoven fabric, for example. The materials forming the secondary battery-equipped device 6 in this embodiment are not limited to these examples. Moreover, a movable ion causing a secondary battery reaction is not limited to a lithium ion and may be a sodium ion, for example.

The power supply 2 supplies a current for charging the secondary battery-equipped devices 6 connected to the plurality of couplers 5. In this example, the plurality of secondary battery-equipped devices 6 are charged with a current from a single power supply 2. Incidentally, the charging device 11 may not include the power supply 2. In that case, the charging device 11 may have an input part which is connectable to a power supply 2 placed outside the charging device 11.

The power transmission lines 4 are placed between the power supply 2 and the plurality of couplers 5. The power transmission lines 4 transmit, to the secondary battery-equipped devices 6 connected to the couplers 5, a current for charging. The number of power transmission lines 4 is the same as the number of couplers 5. In this example, power transmission lines 4a to 4e are provided for the couplers 5a to 5e respectively. Incidentally, the power transmission lines 4 simply have to apply power to a selected secondary battery-equipped device 6 of the plurality of secondary battery-equipped devices 6 connected to the plurality of couplers 5, and the number and configuration thereof are not limited to those described in the drawing. For example, in place of the power transmission lines 4, electric power may be supplied to the selected secondary battery-equipped device 6 wirelessly.

The controller 3 controls an operation of charging the plurality of secondary battery-equipped devices 6. If the secondary battery-equipped devices 6 to be charged are connected to two or more couplers 5, the controller 3 charges each of these secondary battery-equipped devices 6 repeatedly with a stopping interval placed between charging operations.

During the stopping interval that charging of one secondary battery-equipped device of the secondary battery-equipped devices 6 to be charged is stopped, the controller 3 charges another secondary battery-equipped device. In this way, the controller 3 repeatedly charges each of the secondary battery-equipped devices 6 to be charged with a stopping interval placed between charging operations while switching between the secondary battery-equipped devices to be charged.

The controller 3 may include, for example, a switching circuit that turns on/off electrical connection between the plurality of couplers 5 and a driving circuit that outputs a control signal to the switching circuit. The driving circuit may be, for example, an electronic circuit including an integrated circuit (IC) or large scale integration (LSI). The control signal may be a signal selecting a secondary battery-equipped device to which a charging current is supplied and designating the magnitude and application duration of the charging current. Specifically, the control signal may be a signal for switching the connection between each power transmission line 4 and the power supply 2. The switching circuit connects the power transmission line 4, connected to the selected secondary battery-equipped device 6, to the power supply 2 according to the control signal. "Connect (connected)" here refers to a state in which electrical connection is established. For example, if a switch is provided in each power transmission line 4, "connect (connected)" refers to a state in which the switch is turned on. The controller 3 may further include a monitor that measures the battery voltage of the secondary battery-equipped device 6. In that case, the driving circuit may select the secondary battery-equipped device 6 to be connected to the power supply 2 based on the battery voltage measured by the monitor. The control signal may be, for example, a signal designating the magnitude and application duration of the charging current.

The controller 3 further increases the charging current which is applied to each secondary battery-equipped device 6 with an increase in the number of secondary battery-equipped devices 6 to be charged. Incidentally, in the present disclosure, the "number of secondary battery-equipped devices to be charged" is not necessarily equal to the number of secondary battery-equipped devices connected to the charging device 11 via the couplers 5. For example, the "number of secondary battery-equipped devices to be charged" may be the number obtained by subtracting the number of secondary battery-equipped devices whose charging is determined to be unnecessary at that point in time from the number of secondary battery-equipped devices connected to the charging device 11. The secondary battery-equipped device whose charging is unnecessary is, for example, the fully-charged secondary battery-equipped device.

Since the charging device 11 performs charging while switching the secondary battery-equipped device 6 to be charged of the plurality of secondary battery-equipped devices 6, there is no need to provide a power supply and a controller for each secondary battery-equipped device 6. This makes it possible to simplify the configuration of the charging device 11. Since, during the stopping interval that charging of one secondary battery-equipped device is stopped, it is possible to charge another secondary battery-equipped device, charging can be completed in a short time. Even when the charging current is increased with an increase in the number of secondary battery-equipped devices 6 to be charged, charging is repeated with a stopping interval placed between charging operations. This makes it possible to perform large-capacity charging. On the other hand, when the number of secondary battery-equipped devices 6 to be charged is small, it is possible to limit the charging current value to a lower value. This makes it possible to increase the durability of the charging device 11.

When a plurality of secondary battery-equipped devices 6 to be charged are connected to the charging device 11, the charging device 11 repeats charging for each of the plurality of secondary battery-equipped devices 6 while sequentially switching, in a period, the secondary battery-equipped device 6 to which the charging current is supplied. The period is, for example, within 5 minutes. As described earlier, as a result of multiple charging operations being performed with a stopping interval placed therebetween, high charging capacity can be ensured at a high current at which high charging capacity cannot be obtained in continuous charging. Therefore, even when the charging current is increased, it is possible to implement high-capacity charging in a short time. Since repeated charging is performed on the plurality of secondary battery-equipped devices 6 at different times, one secondary battery-equipped device can be charged during the stopping interval of another secondary battery-equipped device. After sequentially charging the secondary battery-equipped devices from the first secondary battery-equipped device 6a to the last secondary battery-equipped device 6e, for example, the charging device 11 sequentially charges the secondary battery-equipped devices from the first secondary battery-equipped device 6a to the last secondary battery-equipped device 6e again. At this time, the charging time per charging is shorter than that in continuous constant current charging. This makes it possible to charge all of the plurality of secondary battery-equipped devices 6 at high speed by using the single power supply 2 without providing a power supply for each of the secondary battery-equipped devices 6.

In accordance with an increase in the number of secondary battery-equipped devices 6 to be charged, the charging device 11 increases the charging current to each secondary battery-equipped device 6. Therefore, even when the number of secondary battery-equipped devices to be charged is increased, it is possible to perform high-efficiency charging in a short time. On the other hand, when the number of secondary battery-equipped devices to be charged is small, the charging current can be limited to a low value. As a result, deterioration of a current contact within the charging device 11 caused by the high current can be suppressed, for example. This can increase the durability of the charging device 11.

The charging device 11 can perform high-capacity charging on the plurality of secondary battery-equipped devices 6 with a simpler structure in a short time with a high degree of efficiency. In addition, the charging device 11 can have high durability.

In response to an increase in the number of secondary battery-equipped devices 6 to be charged, the controller 3 may shorten an application duration TC of the charging current per charging. This makes it possible to perform high-capacity charging in a short time even when the number of secondary battery-equipped devices 6 to be charged is increased. The detailed reason therefor will be described later. On the other hand, in response to a reduction in the number of secondary battery-equipped devices to be charged, the controller 3 may lengthen the application duration TC of the charging current. This makes it possible to suppress a reduction in the use efficiency of primary source power. In addition, deterioration of the current contact in the charging device 11 caused by the current can be suppressed.

In response to an increase in the number of secondary battery-equipped devices 6 to be charged, the controller 3 may increase a stopping interval TP. This makes it possible to ensure a sufficient stopping interval TP. Therefore, it is possible to implement high-capacity charging in a short time more reliably.

The controller 3 may keep the time average of the charging current from the start of charging to the start of the next charging with a stopping interval placed therebetween approximately constant in one and the same secondary battery-equipped device 6 irrespective of the number of secondary battery-equipped devices 6 to be charged. If, for example, the application duration of a charging current per charging is assumed to be TC, the stopping interval from when the application of the charging current is stopped to when the next application of the charging current is started is assumed to be TP, and the charging current value is assumed to be I, the time average Im of the charging current may be expressed as $I \times TC/(TC+TP)$. The time average of the charging current in each of the secondary battery-equipped devices 6 to be charged may be comparable to a charging current which is set when the secondary battery-equipped device is charged with a continuous constant current. The control of the time average of the charging current makes it possible to implement high-capacity charging in a short time more reliably irrespective of a change in the number of secondary battery-equipped devices 6 to be charged.

The controller 3 may keep the amount of charging electric power constant, the amount of charging electric power per charging for one and the same secondary battery-equipped device 6, irrespective of the number of secondary battery-equipped devices 6 to be charged. At this time, the controller 3 may make the application durations TC of a plurality of charging currents, respectively supplied to the plurality of secondary battery-equipped devices 6 to be charged, equal to one another. This makes it possible to implement high-capacity charging in a short time more reliably.

The controller 3 may set a longer application duration TC for the secondary battery-equipped device with higher full charging capacity. This makes it possible for the charging device 11 to distribute electric power efficiently to the plurality of secondary battery-equipped devices 6 to be charged. As a result, the maximum electric power required by the charging device 11 can be reduced. As an example, the controller 3 may allocate the application duration TC of the charging current for each secondary battery-equipped device 6 depending on the ratio of the full charging capacity.

The controller 3 may supply the charging currents of the same magnitude to the plurality of secondary battery-equipped devices 6 to be charged. This makes it possible to simplify the configuration of the charging device 11.

The plurality of couplers 5 may be couplers for wireless power feeding. This makes it possible to prevent a situation in which charging cannot be performed due to a mismatch between the shape of the coupler 5 and the shape of the secondary battery-equipped device 6. Moreover, it is possible to save the trouble of detaching and attaching the secondary battery-equipped device 6 from and to the coupler 5 and reduce the work risk. Furthermore, it is possible to suppress deterioration of the coupler 5 associated with detachment and attachment of the secondary battery-equipped device 6 therefrom and thereto.

The charging device 11 may further include a battery information acquiring section. The battery information acquiring section acquires information on the specifications of the secondary battery from each of the secondary battery-equipped devices 6 to be charged and then sends the information to the controller 3. The controller 3 can determine the charging condition for each of the secondary battery-equipped devices 6 to be charged by reading the information. This makes it possible for the charging device 11 to determine the charging condition more accurately by reading the specifications of the secondary battery-equipped devices 6 connected to the charging device 11.

The charging device 11 may further include an electricity storage section. In this case, when the number of secondary battery-equipped devices 6 to be charged is smaller than the number of the plurality of couplers 5 (i.e., the maximum number of connections), the controller 3 can charge the electricity storage section by using the power supply. Moreover, when the number of secondary battery-equipped devices 6 to be charged is 2 or more, the controller 3 can charge the secondary battery-equipped devices to be charged with the electric power of the electricity storage section. This makes it possible to reduce the maximum electric power consumption of the charging device 11. As a result, the structure of a primary power receiving section of the charging device 11 can be simplified. Moreover, since the maximum electric power consumption is reduced, depending on the electric rate system, the electric rate for operating the charging device can be reduced.

[Charging Method]

The charging method of this embodiment will be described.

First, a first secondary battery-equipped device of the plurality of secondary battery-equipped devices to be charged is selected. Then, the selected secondary battery-equipped device is charged. A charging current can be set based on, for example, the specifications of the selected secondary battery-equipped device and the number of secondary battery-equipped devices to be charged. Charging is stopped when an application duration TC of a charging current has elapsed, for example. Stopping charging means stopping the application of the charging current to the secondary battery-equipped device. Then, of the plurality of secondary battery-equipped devices to be charged, a secondary battery-equipped device other than the first secondary battery-equipped device is selected as a second secondary battery-equipped device. In other words, the secondary battery-equipped device to which the charging current is applied is switched. Here, the secondary battery-equipped device to which the charging current is applied is switched in such a way that two or more secondary battery-equipped devices are not charged at the same time. The selected second secondary battery-equipped device is charged in the same manner as the first secondary battery-equipped device. Then, the next secondary battery-equipped device is selected as a third secondary battery-equipped device. In this way, the first to N-th secondary battery-equipped devices are selected one at a time and are charged. This cycle is repeated multiple times. For example, after the N-th secondary battery-equipped device is charged, the next cycle is started, and the first secondary battery-equipped device is selected again, for example. As described above, as a result of the cycle being repeated, each secondary battery-equipped device is charged multiple times with a stopping interval placed between the charging operations. If an increase in the number of secondary battery-equipped devices to be charged is detected while the plurality of secondary battery-equipped devices are sequentially charged, the charging condition is changed in such a way as to increase the charging current. In addition to the magnitude of the charging current, other charging conditions may be changed.

In the above-described method, while the selected secondary battery-equipped device is being charged, the voltage of the selected secondary battery-equipped device may be monitored. For example, when the voltage reaches a predetermined charging termination voltage value, charging of the secondary battery-equipped device which is being charged may be stopped. The charging termination voltage value may be determined based on the specifications of the secondary battery in the secondary battery-equipped device, for example. When the secondary battery has a lithium cobalt oxide positive electrode and a graphite negative electrode, the charging termination voltage value may be 4.2 V, for example. A single voltage monitoring device may monitor the voltages of the plurality of secondary battery-equipped devices.

While the selected secondary battery-equipped device is being charged, the temperature of the secondary battery-equipped device which is being charged may be monitored. For example, when the temperature reaches a predetermined charging stop temperature, charging of the secondary battery-equipped device which is being charged may be stopped. This makes it possible to prevent overtemperature. The charging stop temperature is set in accordance with the material and size of the secondary battery in the secondary battery-equipped device. For example, in the case of the secondary battery provided with a metal can and a laminated package, the charging stop temperature may be set at about 40° C.

While the selected secondary battery-equipped device is being charged, the dilation distortion or the inner pressure of a housing that houses the secondary battery, the housing included in the secondary battery-equipped device, may be monitored. For example, when the dilation distortion or the inner pressure reaches a predetermined value, charging of the secondary battery-equipped device which is being charged may be stopped. This makes it possible to suppress a breakdown of the housing and improve the reliability of the charging device. The above-described predetermined value may be appropriately set depending on the material and shape of the housing. For example, when the housing is dilated by 10% or the internal pressure of the housing increases by 20%, charging may be stopped.

Then, with reference to the drawings, an example of the charging method of this embodiment will be described more specifically. FIGS. 6 to 11 are schematic diagrams for explaining the example of the charging method. FIGS. 6 to 11 also depict timing diagrams of charging currents which are supplied to the secondary battery-equipped devices. The timing diagram is, for example, a representative waveform image of a current flowing through each of the power transmission lines 4a to 4e. If a similar waveform is repeated in the timing diagram, only part thereof is depicted.

First, the charging device 11 is in a state in which no secondary battery-equipped device is connected thereto.

Figure 6:
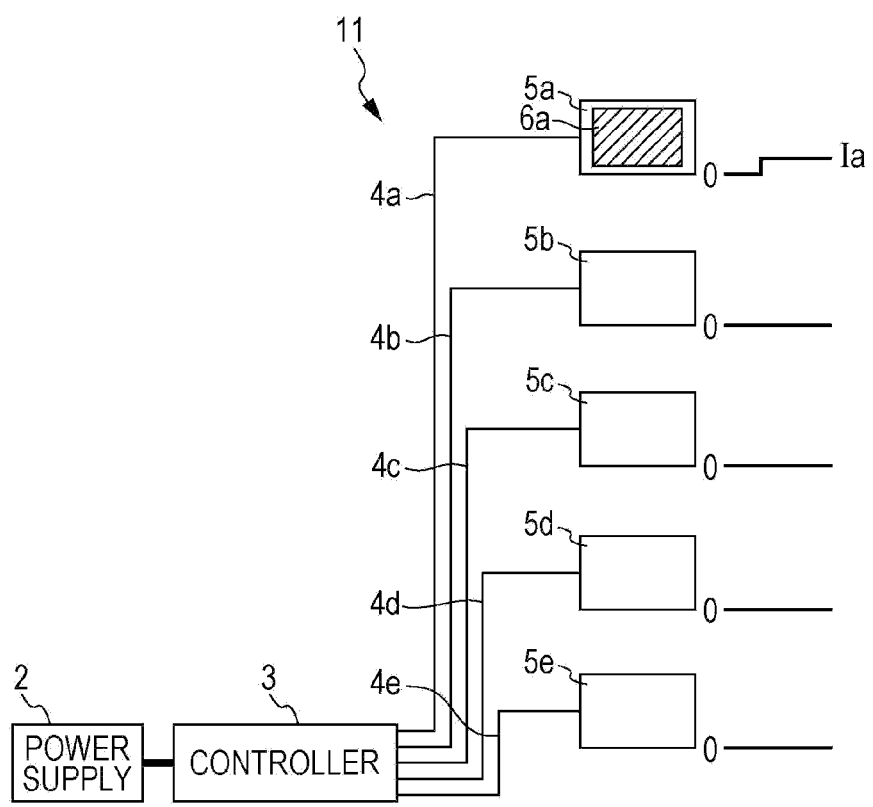
FIG. 6 is a schematic diagram illustrating a process of the charging method.

Then, as depicted in FIG. 6, when one secondary battery-equipped device 6a is connected to the coupler 5a, the controller 3 selects the power transmission line 4a extending between the secondary battery-equipped device 6a and the power supply 2, and then electrically connects the power supply 2 and the power transmission line 4a. As a result, a direct-current charging current is supplied to the secondary battery-equipped device 6a from the power supply 2 via the power transmission line 4a and the coupler 5a, and then the secondary battery-equipped device 6a is charged. The charging current value Ia at this time is 1 A, for example. The direct current is an example of a "continuous current" in the present disclosure. In place of the direct current, currents equivalent to the direct current, such as a slightly fluctuating current and a continuous pulse current which is applied at an extremely short time intervals, may be used. These currents are also included in the examples of the "continuous current".

Figure 7:
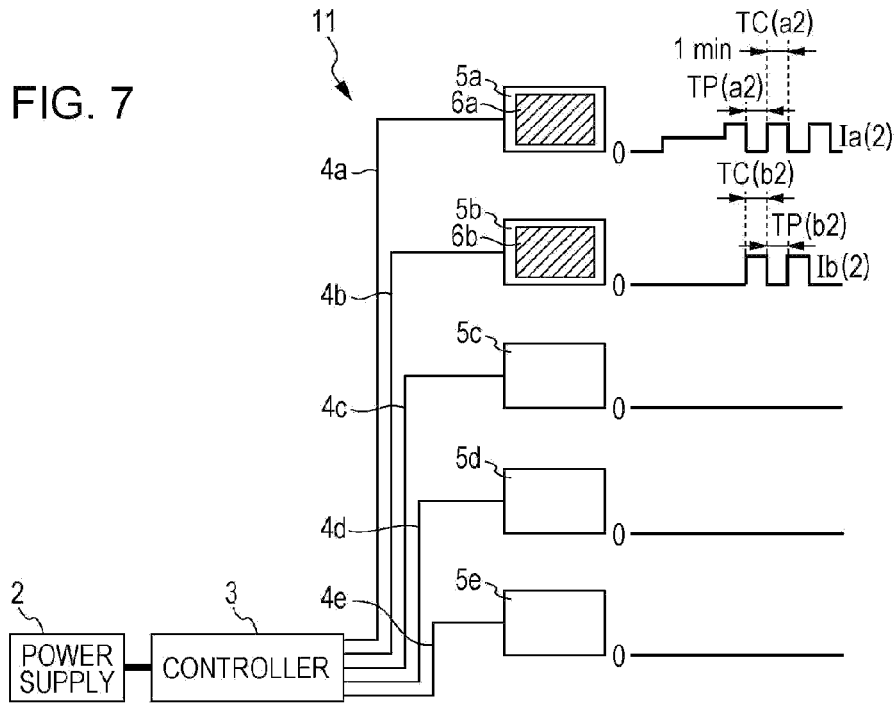
FIG. 7 is a schematic diagram illustrating another process of the charging method.

Then, as depicted in FIG. 7, when another secondary battery-equipped device 6b is further connected to the charging device 11 via the coupler 5b, the controller 3 changes the charging current to the secondary battery-equipped device 6a from the direct current to a pulsed current. As a result, intermittent charging is started on the secondary battery-equipped device 6a. The "pulsed current" here widely includes a current which is supplied repeatedly with a stopping interval placed between supply operations. The "pulsed current" may be, for example, a current whose application duration of a charging current per charging is relatively long, for example, about 10 minutes. The "pulsed current" may include, for example, a plurality of pulses which are applied at an extremely short time intervals. In this case, the envelope of the plurality of pulses applied is shaped like a pulse. In the present disclosure, unless otherwise specified, the "application duration" means the application duration of a charging current per charging.

Charging using a pulsed current is performed also on the secondary battery-equipped device 6b. A period in which the pulsed current supplied to the secondary battery-equipped device 6a and a period in which the pulsed current supplied to the secondary battery-equipped device 6b do not overlap one another. Each of the charging currents supplied to the secondary battery-equipped devices 6a and 6b includes a plurality of pulses applied intermittently, and, between the plurality of pulses, a stopping interval TP is set. In this way, the secondary battery-equipped device 6a and the secondary battery-equipped device 6b are alternately charged.

In the example depicted in FIG. 7, the secondary battery-equipped device 6a is charged with a charging current value Ia(2) for an application duration TC(a2). The application duration TC(a2) may be set at 1 minute, a stopping interval TP(a2) may be set at 1 minute, and the charging current value Ia(2) may be set at 2 A, for example. In this case, the time average Im(a2) of the charging current in one cycle consist of one stopping interval TP(a2) and one application duration TC(a2) is 1 A. The secondary battery-equipped device 6b is charged with a charging current value Ib(2) for an application duration TC(b2). The application duration TC(b2) may be set at 1 minute, a stopping interval TP(b2) may be set at 1 minute, and the charging current value Ib(2) may be set at 2 A, for example. The time average Im(b2) of the charging current is, for example, 1 A. Incidentally, the magnitude and the application duration of the charging current may differ from one secondary battery-equipped device to another.

The way to determine the charging current values Ia(2) and Ib(2) and the application durations TC(a2) and TC(b2) is not limited to a particular way. As an example of an efficient control method, the charging current value Ia(2) of the secondary battery-equipped device 6a may be set at a value which is about twice the charging current value Ia observed when only the secondary battery-equipped device 6a is connected to the charging device 11. Likewise, the charging current value Ib(2) of the secondary battery-equipped device 6b may be set at a value which is about twice the charging current value Ib observed when only the secondary battery-equipped device 6b is connected to the charging device 11. The application durations TC(a2) and TC(b2) may be set at almost the same duration. The application durations TC(a2) and TC(b2) may be 3 to 120 seconds, for example, but the application durations TC(a2) and TC(b2) are not limited thereto. With this method, it is easy to determine the charging condition and it is possible to simplify the structure and the control program of the controller 3. Moreover, the total charging time required for the secondary battery-equipped devices 6 to be fully charged can be maintained at an almost constant time irrespective of the number of secondary battery-equipped devices 6 which are connected to the charging device 11.

Figure 8:
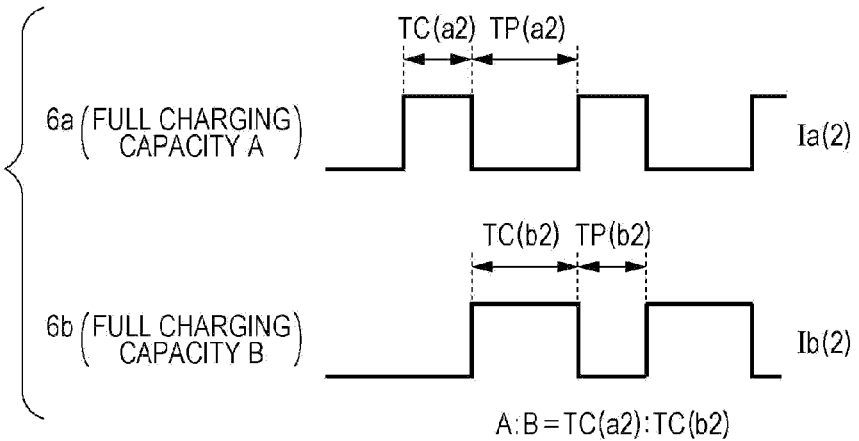
FIG. 8 is a schematic diagram illustrating still another process of the charging method.

As another example of the efficient control method, a charging current with a longer application duration may be supplied to the secondary battery-equipped device 6a or the secondary battery-equipped device 6b, whichever is higher in full charging capacity. For example, when the full charging capacity B of the secondary battery-equipped device 6b is higher than the full charging capacity A of the secondary battery-equipped device 6a, the controller 3 may make the application duration TC(b2) longer than the application duration TC(a2). For example, as depicted in FIG. 8, the ratio between the application duration TC(a2) and the application duration TC(b2) may be equal to the ratio between the full charging capacity A of the secondary battery-equipped device 6a and the full charging capacity B of the secondary battery-equipped device 6b (A:B=TC(a2):TC(b2)). In this case, the charging current values Ia(2) and Ib(2) of the secondary battery-equipped devices 6a and 6b may be set at almost the same current value. The application durations TC(a2) and TC(b2) may be 3 to 120 seconds, for example, but the application durations TC(a2) and TC(b2) are not limited thereto. Alternatively, if the charging current value observed when only the secondary battery-equipped device 6a is connected to the charging device 11 is assumed to be Ia and the charging current value observed when only the secondary battery-equipped device 6b is connected to the charging device 11 is assumed to be Ib, the charging current values Ia(2) and Ib(2) may be set as follows, for example.

$$Ia(2)=(A+B)\times Ia/A$$

$$Ib(2)=(A+B)\times Ib/B$$

With this method, the maximum value of the charging current of the charging device 11 is limited to a lower value. As a result, the structure of a primary power receiving section of the charging device 11 can be simplified. Since the maximum electric power consumption is reduced, depending on the electric rate system, the electric rate for operating the charging device 11 can be reduced.

Figure 9:
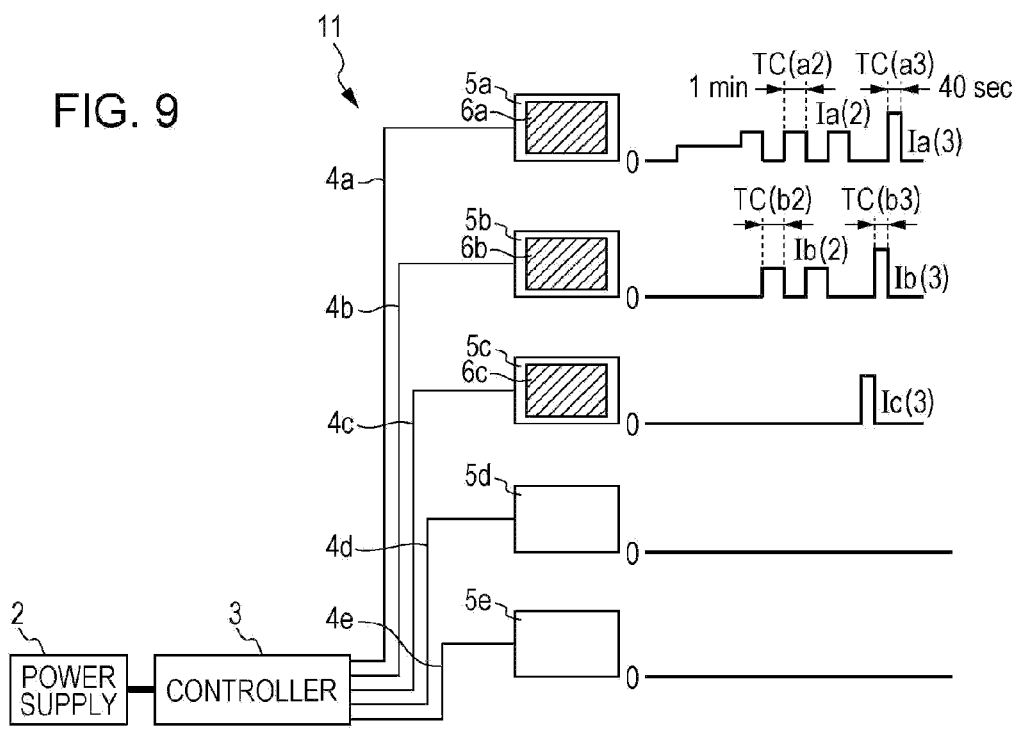
FIG. 9 is a schematic diagram illustrating still another process of the charging method.

Then, as depicted in FIG. 9, when still another secondary battery-equipped device 6c is further connected, the controller 3 of the charging device 11 changes the magnitudes of the charging currents to the secondary battery-equipped devices 6a and 6b. A charging current value Ia(3) to the secondary battery-equipped device 6a after the change is greater than the charging current value Ia(2) observed when there are two secondary battery-equipped devices to be charged. Likewise, a charging current value Ib(3) to the secondary battery-equipped device 6b after the change is greater than the charging current value Ib(2) observed when there are two secondary battery-equipped devices to be charged (Ib(3)>Ib(2)). Charging using a pulsed current is performed also on the newly connected secondary battery-equipped device 6c. The pulsed currents to the secondary battery-equipped devices 6a, 6b, and 6c do not temporally overlap one another. Each of the charging currents supplied to the secondary battery-equipped devices 6a, 6b, and 6c includes a plurality of pulses applied intermittently, and, between the plurality of pulses, stopping intervals TP(a3), TP(b3), and TP(c3) are set. The secondary battery-equipped devices 6a to 6c are sequentially charged repeatedly.

In the example depicted in FIG. 9, the secondary battery-equipped devices 6a, 6b, and 6c are charged with the charging current values Ia(3), Ib(3), and Ic(3) for application durations TC(a3), TC(b3), and TC(c3), respectively. The application durations TC(a3), TC(b3), and TC(c3) may be set at 40 seconds, and the stopping intervals TP(a3), TP(b3), and TP(c3) may be set at 80 seconds, for example. The charging current values Ia(3), Ib(3), and Ic(3) may be set at 3 A, for example. At this time, the time average Im(a3) of the charging current in one cycle consist of one stopping interval TP(a3) and one application duration TC(a3) is 1 A. Likewise, the time averages Im(b3) and Im(c3) of the charging current are also 1 A. Incidentally, the magnitude of the charging current and the application duration TC of the charging current may differ from one secondary battery-equipped device to another.

The way to determine the charging current values Ia(3), Ib(3), and Ic(3) and the application durations TC(a3), TC(b3), and TC(a3) is not to limited to a particular way. As an example of an efficient control method, the charging current value Ia(3) of the secondary battery-equipped device 6a may be set at a value which is about triple the charging current value Ia observed when only the secondary battery-equipped device 6a is connected to the charging device 11. The charging current value Ib(3) of the secondary battery-equipped device 6b may be set at a value which is about triple the charging current value Ib observed when only the secondary battery-equipped device 6b is connected to the charging device 11. The charging current value Ic(3) of the secondary battery-equipped device 6c may be set at a value which is about triple a charging current value Ic observed when only the secondary battery-equipped device 6c is connected to the charging device 11. The application durations TC(a3), TC(b3), and TC(c3) may be almost the same. The application durations TC(a3), TC(b3), and TC(c3) may be 3 to 120 seconds, for example, but the application durations TC(a3), TC(b3), and TC(c3) are not limited thereto. With this method, it is easy to determine the charging condition and it is possible to simplify the structure and the control program of the controller 3. Moreover, the total charging time required for the secondary battery-equipped devices 6 to be fully charged can be maintained at an almost constant time irrespective of the number of secondary battery-equipped devices 6 which are connected to the charging device 11.

As another example of the efficient control method, a charging current with a longer application duration may be supplied to a secondary battery-equipped device of the secondary battery-equipped devices 6a to 6c, the secondary battery-equipped device with higher full charging capacity. For example, the ratio among the application duration TC(a3), the application duration TC(b3), and the application duration TC(c3) may be equal to the ratio among the full charging capacity A of the secondary battery-equipped device 6a, the full charging capacity B of the secondary battery-equipped device 6b, and the full charging capacity C of the secondary battery-equipped device 6c (A:B:C=TC(a3):TC(b3):TC(c3)). In this case, the charging current values Ia(3), Ib(3), and Ic(3) of the secondary battery-equipped devices 6a to 6c may be set at almost the same current value. The application durations TC(a3), TC(b3), and TC(c3) may be 3 to 120 seconds, for example, but the application durations TC(a3), TC(b3), and TC(c3) are not limited thereto. Alternatively, if the charging current value observed when only the secondary battery-equipped device 6a is connected to the charging device 11 is assumed to be Ia, the charging current value observed when only the secondary battery-equipped device 6b is connected to the charging device 11 is assumed to be Ib, and the charging current value observed when only the secondary battery-equipped device 6c is connected to the charging device 11 is assumed to be Ic, the charging current values Ia(3), Ib(3), and Ic(3) may be set as follows, for example.

$$Ia(3)=(A+B+C)\times Ia/A$$

$$Ib(3)=(A+B+C)\times Ib/B$$

$$Ic(3)=(A+B+C)\times Ic/C$$

With this method, the maximum value of the charging current of the charging device 11 is limited to a lower value. As a result, the structure of a primary power receiving section of the charging device 11 can be simplified. Since the maximum electric power consumption is reduced, depending on the electric rate system, the electric rate for operating the charging device 11 can be reduced.

When still another secondary battery-equipped device 6d is further connected from the state depicted in FIG. 9, the controller 3 of the charging device 11 changes the magnitudes of the charging currents to the secondary battery-equipped devices 6a to 6c in a similar manner. A charging current value Ia(4) to the secondary battery-equipped device 6a after the change is greater than the charging current value Ia(3). Likewise, charging current values Ib(4) and Ic(4) to the secondary battery-equipped devices 6b and 6c are greater than the charging current values Ib(3) and Ic(3), respectively. Charging using a pulsed current is performed also on the newly connected secondary battery-equipped device 6d. When still another secondary battery-equipped device 6e is further connected and there are five secondary battery-equipped devices to be charged, the controller 3 increases the charging currents in a similar manner. The charging pulse currents of the secondary battery-equipped devices 6a to 6e do not temporally overlap one another. Each of the charging currents supplied to the secondary battery-equipped devices 6a to 6e includes a plurality of pulses applied intermittently, and, between the plurality of pulses, a stopping interval is set. The secondary battery-equipped devices 6a to 6e are sequentially charged repeatedly.

As is the case with the above-described method, when there are five secondary battery-equipped devices 6 to be charged, the application durations TC of the charging currents to these secondary battery-equipped devices 6 may be set so as to be equal to one another. For example, charging current values Ia(5) to Ie(5) of the secondary battery-equipped devices 6a to 6e may be set at values which are about five-times the charging current values Ia to Ie, each being observed when each of the secondary battery-equipped devices is connected to the charging device 11 alone. As described above, when the number of secondary battery-equipped devices 6 to be charged is N, a charging current value I(N) to one secondary battery-equipped device 6 may be set at a value N-times a charging current value I observed when only the secondary battery-equipped device 6 is charged by the charging device 11.

The application duration TC of the charging current may be made different from one secondary battery-equipped device 6 to another. In this case, the charging current to the secondary battery-equipped device 6 may be set in such a way that, the higher full charging capacity the secondary battery-equipped device has, the greater the charging current thereto is made. For example, if the full charging capacity of the secondary battery-equipped device 6a is assumed to be A and the total of the full charging capacities of the five secondary battery-equipped devices 6a to 6e to be charged are assumed to be (A+B+C+D+E), the charging current value Ia(5) to the secondary battery-equipped device 6a may be set at (A+B+C+D+E)×Ia/A. As described above, when the number of secondary battery-equipped devices 6 to be charged is N, a charging current to one secondary battery-equipped device may be set in accordance with the charging current value I observed when the secondary battery-equipped device is charged alone and the ratio of the full charging capacity of the secondary battery-equipped device to the total of the full charging capacities of the N secondary battery-equipped devices.

Figure 10:
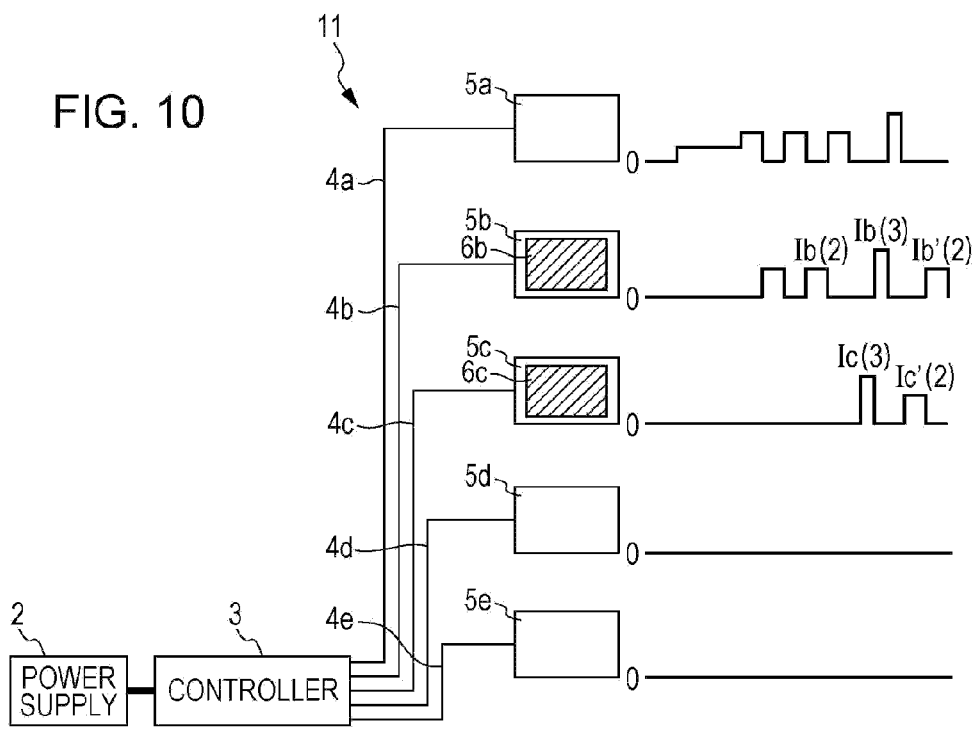
FIG. 10 is a schematic diagram illustrating still another process of the charging method.

On the other hand, when the number of secondary battery-equipped devices 6 to be charged is reduced, the controller 3 may change the charging current. For example, FIG. 10 depicts a state in which charging of the secondary battery-equipped device 6a is completed, after a state in which the charging device 11 intermittently repeat the charging of the three secondary battery-equipped devices 6a to 6c as depicted in FIG. 9. When charging of the secondary battery-equipped device 6a is completed, the number of secondary battery-equipped devices to be charged is reduced from 3 to 2. With this reduction, the controller 3 changes the magnitudes of the charging currents to the secondary battery-equipped device 6b and the secondary battery-equipped device 6c. A charging current value Ib'(2) to the secondary battery-equipped device 6b after the change is smaller than the charging current value Ib(3) observed when there are three secondary battery-equipped devices to be charged. Likewise, a charging current value Ic'(2) to the secondary battery-equipped device 6c after the change is smaller than the charging current value Ic(3) observed when there are three secondary battery-equipped devices to be charged. Incidentally, the charging current value Ib'(2) may be different from or the same as the charging current value Ib(2) described earlier with reference to FIG. 7. The pulsed currents of the secondary battery-equipped devices 6b and 6c do not temporally overlap one another. Each of the charging currents supplied to the secondary battery-equipped devices 6b and 6c includes a plurality of pulses applied intermittently, and, between the plurality of pulses, a stopping interval is set. As a result, the secondary battery-equipped device 6b and the secondary battery-equipped device 6c are alternately charged repeatedly. The way to determine the magnitude and the application duration of the charging current is not limited to a particular way, and the methods described earlier with reference to FIGS. 7 to 9 can be used.

Figure 11:
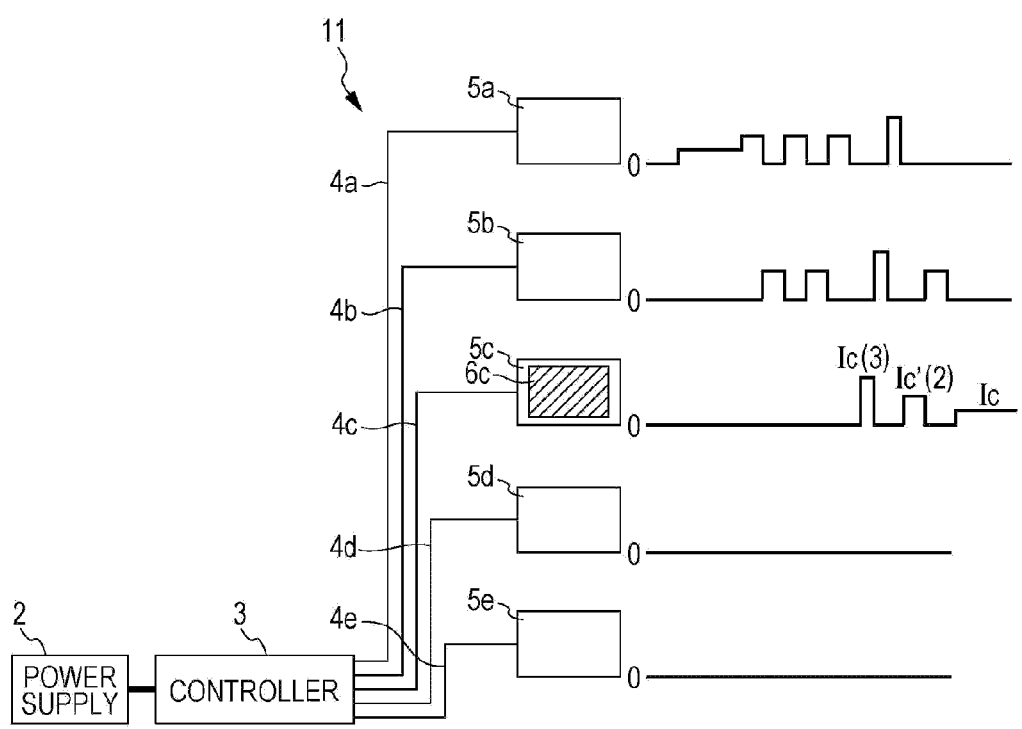
FIG. 11 is a schematic diagram illustrating still another process of the charging method.

Then, as depicted in FIG. 11, when charging of the secondary battery-equipped device 6b is further completed, there is only one secondary battery-equipped device to be charged: the secondary battery-equipped device 6c. With this, the controller 3 may change the charging current condition of the secondary battery-equipped device 6c. For example, the secondary battery-equipped device 6c can be charged with a direct current or a current equivalent to the direct current. In the example depicted in FIG. 11, the secondary battery-equipped device 6c is charged with a continuous constant current having the charging current value Ic.

[Other Examples of the Charging Device]

Figure 5:
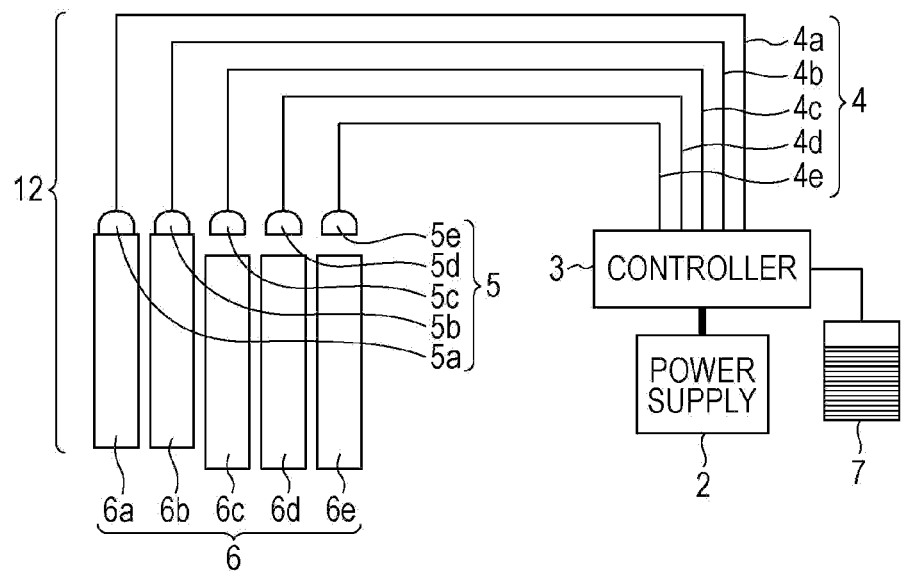
FIG. 5 is a schematic diagram depicting a configuration example of another charging device.

Next, with reference to the drawings, another example of the charging device of this embodiment will be described. FIG. 5 is a schematic diagram depicting a configuration example of another charging device 12 of this embodiment. The charging device 12 differs from the charging device 11 depicted in FIG. 1 in that the charging device 12 includes an electricity storage section 7. Since the other configurations of the charging device 12 are the same as those of the charging device 11, their descriptions will be omitted.

In the charging device 12, when the number of secondary battery-equipped devices 6 to be charged is smaller than the number of couplers 5, the electricity storage section 7 can be charged by the power supply 2. In the example depicted in FIG. 5, since the number of secondary battery-equipped devices 6 to be charged is 2, smaller than the number of couplers 5, a current can be supplied to the electricity storage section 7 from the power supply 2. In other words, when the number of secondary battery-equipped devices 6 to be charged is small, the electricity storage section 7 is charged. As a result, when the number of secondary battery-equipped devices 6 to be charged is increased, the electricity storage section 7 can feed power to the secondary battery-equipped devices 6. Typically, there is a possibility that the higher a primary current becomes, the larger a primary power receiving section of the charging device becomes. On the other hand, since the charging device 12 includes the electricity storage section 7, it is possible to reduce the maximum electric power consumption of the charging device 12. As a result, the structure of a primary power receiving section of the charging device 12 can be simplified. Moreover, since the maximum electric power consumption is reduced, depending on the electric rate system, the electric rate for operating the charging device can be reduced.

After a predetermined application duration TC has elapsed after the start of application of a charging current to a selected secondary battery-equipped device 6, the controller 3 in this embodiment may stop charging to the secondary battery-equipped device 6 and then switch over to a secondary battery-equipped device 6 to which the charging current is applied next.

The controller 3 may perform switching of the secondary battery-equipped device 6 based on not only the application duration TC of the charging current, but also the voltage of the secondary battery-equipped device 6 which is being charged. For example, the controller 3 monitors the voltage of the secondary battery-equipped device 6 which is being charged. When the voltage which is being monitored reaches a predetermined value with the progress of charging, the controller 3 may stop charging of the secondary battery-equipped device 6 which is being charged and then switch over to a secondary battery-equipped device 6 to which the charging current is applied next. This makes it possible to prevent overcharging of the secondary battery-equipped device 6 more effectively. As a result, deterioration of the secondary battery can be suppressed. This switching may be performed before the set application duration TC has elapsed, that is, while the charging current is being applied.

In this case, the charging time in that charging becomes shorter than the set application duration TC. As a result, for example, even when the application duration per charging is set at a relatively long duration, it is possible to suppress overcharging more reliably. In other words, it is possible to set an application duration at a longer duration while suppressing overcharging. Therefore, the number of switching operations performed on the secondary battery-equipped device 6 to be charged can be reduced. This makes it possible to suppress the loss of switching time and contact deterioration caused by switching. Moreover, when charging is finished in a shorter time than the set application duration, charging of a secondary battery-equipped device to be charged next is started earlier by the amount of time thus shortened. Therefore, the total charging time of the secondary batteries can be shortened. The "total charging time" refers to, for example, a time between the start of first charging of the first secondary battery-equipped device and the completion of full charge of all the secondary battery-equipped devices.

The controller 3 may provide a voltage monitoring device to monitor the voltage of the secondary battery-equipped device 6. A plurality of voltage monitoring devices may be placed, one for each of the secondary battery-equipped devices 6. A single voltage monitoring device may monitor the voltages of the plurality of secondary battery-equipped devices 6. As a result of the voltage monitoring device monitoring the voltages of the secondary battery-equipped devices 6 intermittently and frequently, it is possible to prevent deterioration of the secondary batteries.

For example, to the secondary battery-equipped device 6 that has reached a predetermined voltage, a charging current with a shorter application duration TC' may be applied intermittently. This allows the charging capacity to increase gradually. At this time, the application duration TC' may be 10 seconds, for example. Moreover, the application duration TC' may be changed to 2 seconds or less or 1 second or less depending on the voltage of the secondary battery-equipped device 6.

Selection as to whether the secondary battery-equipped device 6 that has reached a predetermined value is further charged or charging is ended may be made when the secondary battery-equipped device 6 is selected again. This determination may be made depending on the voltage of the secondary battery-equipped device 6. When the secondary battery-equipped device 6 that has reached the predetermined value is further charged, the number of charging operations may be set. This can reduce the burden on the charging device or the secondary battery-equipped device.

In place of monitoring the voltage of the secondary battery-equipped device 6, the controller 3 may monitor the temperature of the secondary battery-equipped device 6. The controller 3 may include a temperature monitoring device, for example. A plurality of temperature monitoring devices may be placed, one for each of the secondary battery-equipped devices 6. A single temperature monitoring device may monitor the temperatures of the plurality of secondary battery-equipped devices 6. As a method for switching an object to be charged when the temperature of the secondary battery-equipped device 6 which is being charged reaches a predetermined temperature or more, a method similar to the method in a case where the voltage is monitored may be adopted.

In place of monitoring the voltage of the secondary battery-equipped device 6, the controller 3 may monitor the dilation distortion or the inner pressure of the housing in the secondary battery-equipped device 6, the housing in which the secondary battery is housed. The controller 3 may include, for example, a position sensor, a piezoelectric sensor, or a sensor including a film or a wire in which a tension fracture occurs. As a method for switching an object to be charged when the dilation distortion or the inner pressure of the secondary battery which is being charged reaches a predetermined degree or more, a method similar to the method in a case where the voltage is monitored may be adopted.

To perform various switching controls described above, the controller 3 may include a monitoring device. Some examples of the monitoring device include a timer, a charging voltage monitor, a temperature monitor, and a dilation monitor. The controller 3 may include a driving circuit and a switching circuit. The driving circuit may select a secondary battery-equipped device 6 to be charged based on a signal from the monitoring device. The switching circuit switches connection between the power transmission line 4 and the power supply 2 based on the control signal from the driving circuit. The driving circuit may be, for example, a sequencer including a programmable controller, a relay sequencer, or a controller using a computer. The switching circuit may be, for example, a mechanical relay, a solid-state relay, a switching circuit using various couplers such as an optical coupler, or a wireless power feeding-type connecting device. However, the configuration of the controller 3 is not limited to those described above.

Incidentally, in FIG. 1, one line represents each of the power transmission lines 4a to 4e, but each power transmission line 4 may be formed of a plurality of cables. Each of the power transmission lines 4a to 4e may be a plurality of cables or a multifilament cable in order to monitor the voltage of the secondary battery-equipped device 6, monitor the temperature thereof, for example.

Part of the power transmission lines 4 may be replaced by a wireless power feeder. Various data for monitoring may be sent via wireless communication.

The contents of communication performed via the power transmission lines or performed wirelessly include, for example, information on the type and/or the charging condition of the secondary battery-equipped device 6. This allows the controller 3 to select the optimum charging condition. As a result, charging troubles and deterioration of the secondary battery can be suppressed. The charging device 11 may keep a record of charging operations. This record can be used to, for example, find out the cause of a trouble when the trouble occurs.

[Magnitude and Application Duration of the Charging Current]

A pulsed charging current may be a high current at which high charging capacity cannot be obtained if the current is a continuous constant current. The current value of the pulsed charging current may differ depending on the secondary battery-equipped device 6 to which the current is supplied. The pulsed charging current may be a high current at which, if the current is supplied to the secondary battery-equipped device 6 for a long time, the battery voltage rises and charging is terminated before the battery capacity reaches the desired battery capacity.

For example, when the number of secondary battery-equipped devices 6 to be charged is greater than or equal to a predetermined number of secondary battery-equipped devices to be charged or is equal to the number of couplers 5, the charging device may perform charging at the above-described high current. The predetermined number of secondary battery-equipped devices to be charged may be, for example, 3 or more. For example, the pulsed charging current may be a high current that reduces, if the current is a continuous constant current, the charging capacity by 20% or more. At this time, the application duration TC of the charging current per charging is set at, for example, a shorter duration than the application duration used before the charging current was increased. The application duration TC may be, for example, within 5 minutes, within 1 minute, or within 30 seconds.

Here, a current value that reduces the charging capacity by 20% with respect to the maximum charging capacity in continuous charging is referred to as a "reference charging current value s1". At this time, the pulsed charging current may be set at a value which is greater than or equal to the reference charging current value s1. In order to perform charging at higher speed, the charging current may have a magnitude which is greater than or equal to a current at which the charging capacity is reduced by 50% or 70% in continuous charging. The charging current may be set at a value which is greater than or equal to a current value s2 at which the charging capacity is reduced significantly in continuous charging. The charging current may be set at a current value which is five or more times, or ten or more times a recommended current of the secondary battery in the secondary battery-equipped device. For example, the time average of the charging current may be set so as to be smaller than or equal to the reference charging current value s1 or the current value s2.

Next, the reason why the charging device and the charging method of this embodiment are especially excellent as a charging device and a charging method for a plurality of secondary battery-equipped devices will be described.

Typically, if the charging current is increased excessively, the charging capacity of the secondary battery is reduced significantly. It is for this reason that the charging current is typically set so as to be lower than or equal to a certain degree in order to obtain high charging capacity. The reason why a too high charging current makes it impossible to obtain sufficient charging capacity is considered as follows. There is a limit to the speed at which ions can diffuse in an electrolytic solution and an active material in the secondary battery. When a high current is supplied to the secondary battery, a rapid concentration gradient of ions such as lithium is generated on the surface of the active material, for example. This concentration gradient may prevent the diffusion of ions and reduce the ions that can be used for charging. In accordance with the experiment performed by the inventors, when continuous charging was performed by using a high charging current, high charging capacity could not be obtained.

Therefore, in the existing charging method, continuous charging is performed on the secondary battery by using a relatively low current in order to obtain high charging capacity. When a plurality of secondary battery-equipped devices are charged by this method, as depicted in FIG. 18, there is a need to prepare a plurality of power supplies 2 or an output circuit with a plurality of outputs. This increases the size of a device and also increases device cost.

On the other hand, in the charging method of this embodiment, a pulsed charging current is repeatedly supplied to the plurality of secondary battery-equipped devices 6 with a stopping interval placed between the supply operations. As a result, even when the charging current value is large, ions can diffuse during the stopping interval. This makes it possible to ensure high charging capacity. Moreover, it is possible to charge the plurality of secondary battery-equipped devices 6 with a high degree of efficiency in a shorter time than in the existing method.

When the pulsed charging current is a high current, the application duration TC may be set at less than a charging time in which the maximum charging capacity is reduced by 20% or more, for example. The application duration TC may be set at less than 1 hour, for example. The shorter the application duration TC, the more effectively a reduction in charging capacity can be suppressed. The application duration TC may be, for example, within 5 minutes, within 1 minute, or within 30 seconds. On the other hand, the application duration TC may be set at, for example, 1 second or more, 10 seconds or more, or 30 seconds or more. This makes it possible to suppress time loss caused by switching and energy loss caused by a high-frequency component. The stopping interval TP may be, for example, 3 seconds or more or 30 seconds or more. This makes it possible to ensure time for ions to move. The stopping interval TP may be 5 minutes or more. The stopping interval TP may be two or more times or five or more times the application duration TC of the charging current. When N secondary battery-equipped devices 6 are charged, the stopping interval TP may be N or more times the application duration TC.

Experimental Examples

Next, experimental examples related to the charging method of this embodiment will be described. The inventors examined the relationship between a charging current and charging capacity for each of two types of cells for evaluations: cells C-1 and C-2 using different materials as an active material.

<Examination of a Charging Method of a Cell C-1>

First, a cell C-1 used to examine the charging method was prepared. A positive electrode was a coating film formed on aluminum foil, the coating film containing a positive-electrode active material, a conductive aid, and a binder. The thickness of the aluminum foil was 15 µm. The positive-electrode active material was a composite oxide of Ni, Co, and Mn, the composite oxide containing lithium. The thickness of the coating film was 50 µm. A negative electrode was a lithium metal leaf pasted to a copper electrode by being pressed thereto. The thickness of the lithium metal leaf was 300 µm. Between the positive electrode and the negative electrode, two porous separators were placed. The thickness of the separator was 20 µm. The separator was filled with an electrolytic solution. The electrolytic solution contained 1 mol/L of $LiPF_6$ dissolved in a non-aqueous solvent.

Figure 12:
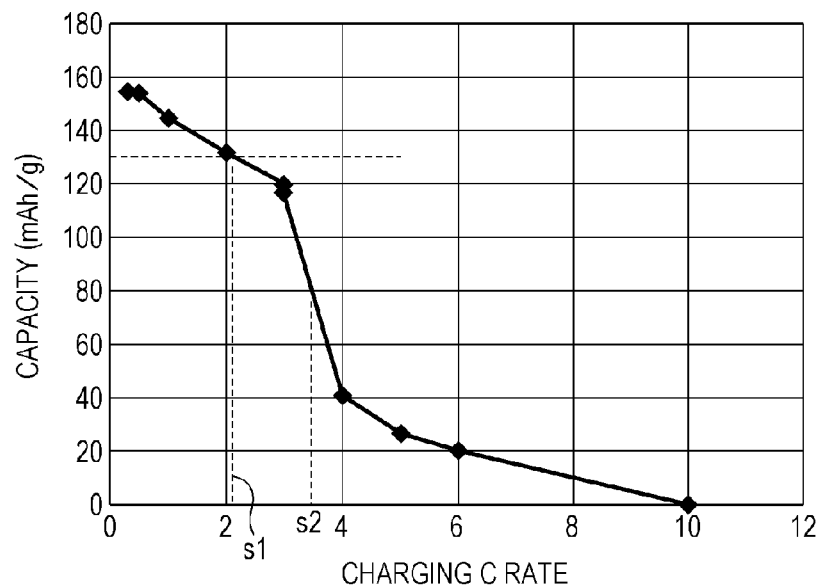
FIG. 12 is a diagram depicting an example of the relationship between a charging current and charging capacity in continuous charging of a cell.

Next, continuous charging was performed on the cell C-1 by using a direct-current constant current, and the relationship between the charging current and the charging capacity was measured. FIG. 12 depicts an example of the relationship between the charging current and the charging capacity in continuous charging of the cell C-1.

The results depicted in FIG. 12 reveal that the charging capacity is reduced as the charging current is increased in continuous charging. Therefore, in order to obtain the maximum charging capacity or high charging capacity close thereto, it is necessary to set the charging current at, for example, about 2 C or less. In the example depicted in FIG. 12, if continuous charging is performed on the cell C-1 by using 4 C, only about 25% of the maximum charging capacity (here, about 150 to 160 mAh/g) that can be obtained when charging is performed by using a low current can be obtained. Here, "1 C" represents a current value observed when the amount of electricity corresponding to the amount of charging when the battery is charged to full charging capacity with a low current is transmitted in one hour. The greater the C value, the higher the charging current. For example, charging by using 0.1 C means charging using the amount of electricity by which the charging capacity reaches full charging capacity in 10 hours.

In order to obtain capacity of more than 80% of the maximum charging capacity by performing continuous charging on the cell C-1, the charging current has to be set at a low current which is less than 2 C, for example. As a result, it takes a long time to fully charge all the secondary battery-equipped devices connected to the charging device.

In the example depicted in FIG. 12, the reference charging current value s1 which is a current value at which the charging capacity is reduced by 20% with respect to the maximum charging capacity was about 2 C. The current value s2 at which the charging capacity is reduced significantly was about 3.5 C. Incidentally, the current value s2 may be, for example, a current value at which the gradient of the graph depicted in FIG. 12 is maximized. In other words, if the charging capacity is assumed to be $C_A$ and the charging current is assumed to be I, the current value s2 may be a current value at which $\Delta C_A/\Delta I$ is maximized.

Figure 13:
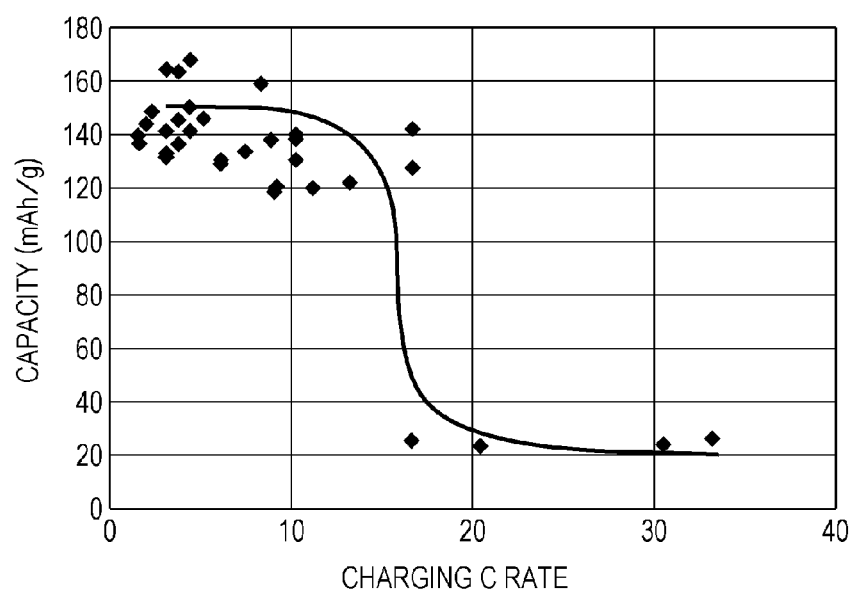
FIG. 13 is a diagram depicting an example of the relationship between a charging current and charging capacity in intermittent charging of the cell.

Then, the cell C-1 was charged intermittently with a pulsed charging current with a stopping interval placed between charging operations, and then the relationship between the charging current and the charging capacity was measured. In intermittent charging, the application duration TC of the charging current was 10 seconds and the stopping interval TP was 90 seconds. FIG. 13 depicts an example of the relationship between the charging current and the charging capacity in intermittent charging of the cell C-1.

The results depicted in FIG. 13 reveal that, with intermittent charging, it is possible to obtain high charging capacity even at a charging current which is higher than the charging current in continuous charging. For example, even when intermittent charging is performed by using a charging current which is greater than or equal to the reference charging current value s1 or the current value s2, sufficient charging capacity is ensured. In the example depicted in FIG. 13, even when the cell C-1 was charged with a high current of the order of 2 to 12 C, charging capacity of the order of 80% of the maximum charging capacity could be obtained. Therefore, this result reveals that, when intermittent charging is performed on each secondary battery-equipped device by using a current which is greater than or equal to the reference charging current value s1 or the current value s2, it is possible to obtain high charging capacity.

Figure 14:
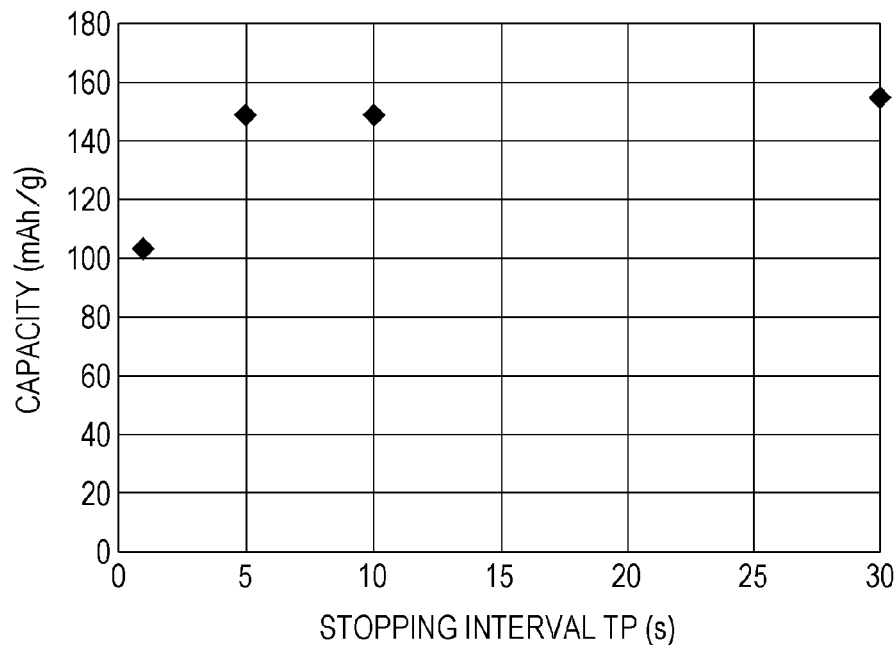
FIG. 14 is a diagram depicting an example of the relationship between a stopping interval and the charging capacity of a secondary battery in intermittent charging of the cell.

FIG. 14 depicts an example of the relationship between the length of a stopping interval TP of charging and charging capacity in intermittent charging of the cell C-1. Here, intermittent charging of the cell C-1 was performed by fixing the application duration TC and the charging current at 10 seconds and 3 C, respectively, and varying the length of the stopping interval TP.

The results depicted in FIG. 14 reveal that, when the stopping interval TP is 5 seconds or more, it is possible to obtain high charging capacity which is approximately equal to the maximum charging capacity. When the stopping interval TP is 5 seconds, the time average Im of the charging current is 2 C by the following expression.

$$(I \times TC)/(TC+TP)=(3C \times 10 \text{ sec})/(10 \text{ sec}+TP(\text{sec}))=2C$$

This time average of the charging current is approximately equal to the reference charging current value s1 described earlier. This result reveals that it is possible to obtain high charging capacity more reliably when the application duration TC of the charging current, the stopping interval TP, and the charging current are set such that the time average of the charging current becomes smaller than or equal to the reference charging current value s1, for example.

Incidentally, FIG. 14 illustrates the results obtained when the width of a charging pulse is set at 10 seconds and the charging current is set at 3 C, but similar results was obtained even when the width of the charging pulse and the charging current are different from those described above. For example, similar results was obtained also when the width of the charging pulse is set at 5 seconds and the charging current is set at 6 C.

<Examination of a Charging Method of a Cell C-2>

A cell C-2 using, as an active material, a material different from that of the cell C-1 was prepared, and an examination similar to that described above was performed. The positive-electrode active material was a Co oxide containing lithium. The thickness of the coating film was 38 µm. Other conditions were the same as those of the cell C-1.

Figure 15:
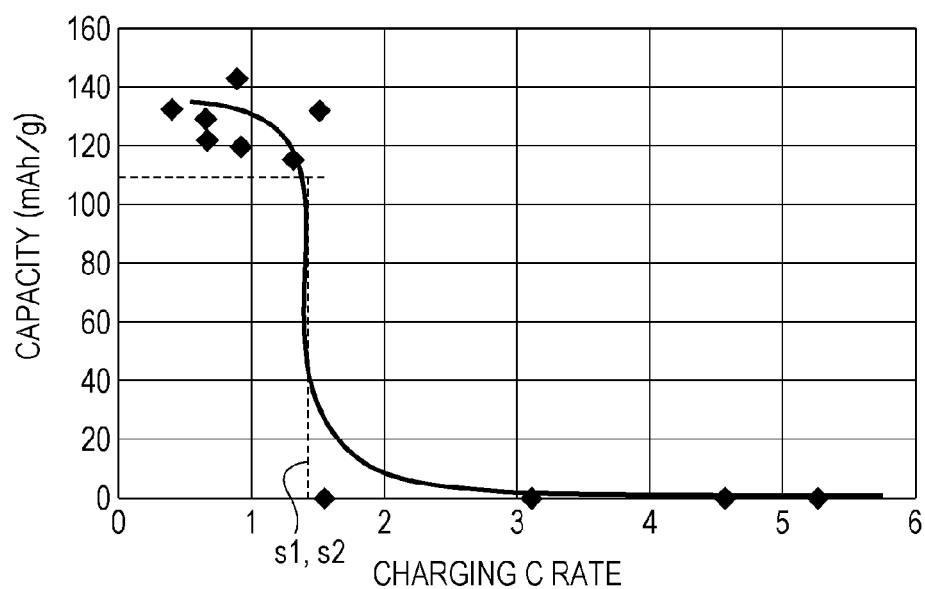
FIG. 15 is a diagram depicting an example of the relationship between a charging current and charging capacity in continuous charging of a cell.

Then, continuous charging was performed on the cell C-2 by using a direct-current constant current, and the relationship between the charging current and the charging capacity was measured. FIG. 15 depicts an example of the relationship between the charging current and the charging capacity in continuous charging of the cell C-2.

The results depicted in FIG. 15 reveal that, in continuous charging, the charging capacity is reduced as the charging current is increased. Therefore, in order to obtain the maximum charging capacity or high charging capacity close thereto, it is necessary to set the charging current at, for example, about 1.5 C or less. In the example depicted in FIG. 15, if continuous charging is performed on the cell C-2 by using 3 C, only 5% or less of the maximum charging capacity (here, about 130 to 140 mAh/g) that can be obtained when charging is performed by using a low current can be obtained.

As described above, in order to obtain capacity of more than 80% of the maximum charging capacity by charging the cell C-2 by continuous charging, the charging current has to be set at a low current which is less than 1.5 C, for example. As a result, it takes a long time to fully charge all the secondary battery-equipped devices connected to the charging device.

In the example depicted in FIG. 15, both the reference charging current value s1 which is a current value at which the charging capacity is reduced by 20% or more with respect to the maximum charging capacity and the current value s2 at which the charging capacity is reduced significantly were about 1.5 C. Incidentally, the current value s2 may be, for example, a current value at which the gradient of the graph depicted in FIG. 15 is maximized.

Figure 16:
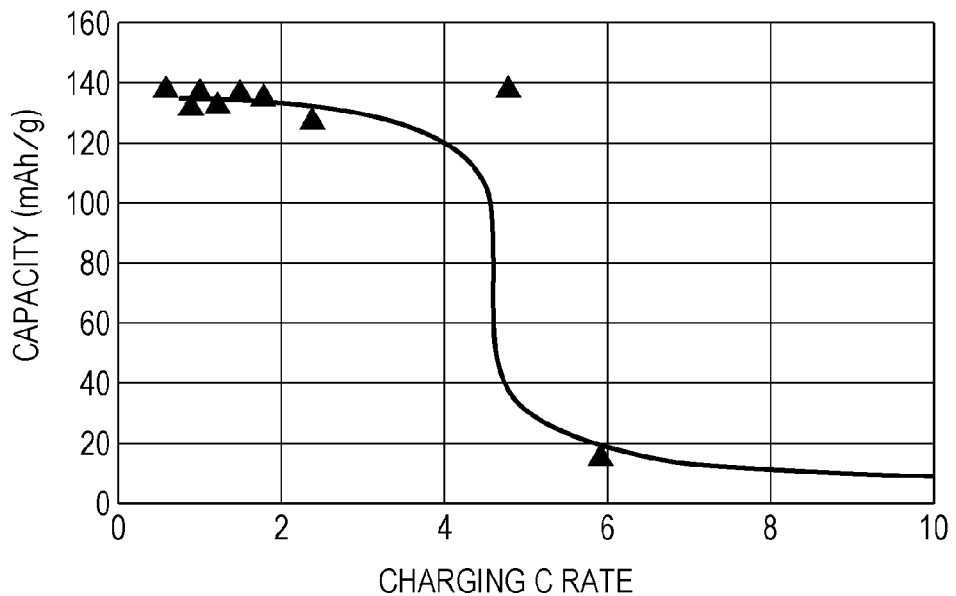
FIG. 16 is a diagram depicting another example of the relationship between a charging current and charging capacity in intermittent charging of the cell.

Then, the cell C-2 was intermittently charged with a pulsed charging current, and the relationship between the charging current and the charging capacity was measured. The application duration TC was 10 seconds, and the stopping interval TP was 90 seconds. FIG. 16 depicts an example of the relationship between the charging current and the charging capacity in intermittent charging.

The results depicted in FIG. 16 reveal that, with intermittent charging, it is possible to obtain high charging capacity even at a charging current which is higher than the charging current in continuous charging. For example, even when intermittent charging is performed by using a charging current which is greater than or equal to the reference charging current value s1 or the current value s2, sufficient charging capacity is ensured. In the example depicted in FIG. 16, even when the cell C-2 was charged with a high current of the order of 1.5 to 2.5 C, charging capacity of the order of 80% of the maximum charging capacity could be obtained. Therefore, this result reveals that, when intermittent charging is performed on each secondary battery-equipped device by using a current which is greater than or equal to the reference charging current value s1 or the current value s2, it is possible to obtain high charging capacity.

Figure 17:
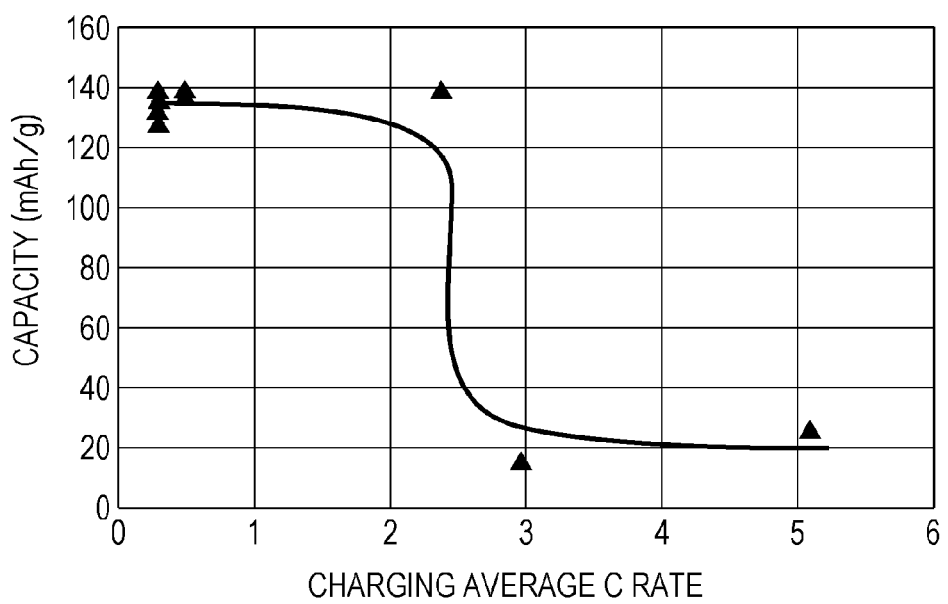
FIG. 17 is a diagram depicting an example of the relationship between an average charging current and charging capacity in intermittent charging of the cell.

FIG. 17 depicts an example of the relationship between an average charging current value and charging capacity in intermittent charging. Here, charging was performed by fixing the application duration TC at 10 seconds and varying the magnitude of the charging current and the length of the stopping interval TP. The average charging current value depicted in FIG. 17 is a value obtained by converting a pulsed charging current used to charge one secondary battery-equipped device into an average charging current value.

In the example depicted in FIG. 17, when the average charging current value was less than 2.5 C, high charging capacity equal to the charging capacity obtained when continuous charging was performed by using a low current which was 1.5 C or less could be obtained. This result reveals that, with intermittent charging, a plurality of secondary battery-equipped devices are charged efficiently.

While the modes for embodying the present disclosure have been specifically described, the present disclosure is not limited thereto. The numerical values, materials, component elements, placement of the component elements, connection configurations thereof, waveforms, and so forth described in this embodiment are mere examples and are not meant to limit the present disclosure. Moreover, of the above-illustrated component elements, a component element which is not described in an independent claim illustrating the broadest concept is described as an arbitrary component element.

In this embodiment, descriptions have been given by taking up, as an example, a case where the maximum number of secondary battery-equipped devices 6 connected to the charging device 11 or 12 is 5. However, the maximum number of secondary battery-equipped devices connected to the charging device is not limited thereto. Moreover, in the experimental examples described above, an example in which the positive-electrode active material is a lithium cobalt oxide and an example in which the positive-electrode active material is a composite oxide of Ni, Co, and Mn, the composite oxide containing lithium, have been described. However, the positive-electrode active material of this embodiment is not limited to these examples. The positive-electrode active material may be, for example, a lithium nickel oxide, lithium manganate, or lithium iron phosphate. In the experimental examples described above, an example in which the negative-electrode active material is lithium has been described. However, the negative-electrode active material of this embodiment is not limited thereto. The negative-electrode active material may be, for example, graphite, a silicon compound, or a tin compound. The above description has been given by taking up, as an example, a case where the ion causing the secondary battery reaction is a lithium ion. However, a reversible ionic material of this embodiment is not limited to the lithium ion. The reversible ionic material may be sodium, for example. Moreover, there may be more than one electron producing the secondary battery reaction.

In the above description, continuous constant current charging is performed when there is one secondary battery-equipped device to be charged and intermittent charging is performed when there are two or more secondary battery-equipped devices to be charged. However, the condition under which switching from continuous constant current charging to intermittent charging can be set appropriately depending on the number of outputs of the charging device, for example. For example, continuous constant current charging may be performed when there are one or two secondary battery-equipped devices to be charged, and intermittent charging may be performed when there are three or more secondary battery-equipped devices to be charged. If the charging device can output a plurality of currents at the same time, pulsed charging currents may be supplied to a plurality of secondary battery-equipped devices at the same time, for example. For example, four secondary battery-equipped devices to be charged may be alternately charged two at a time. The set number based on which switching to intermittent charging is performed may be a fixed value which is determined by a designer in advance. In that case, for example, the signal circuit in the controller may be designed as a circuit incorporating the set number. Alternatively, the set number may be set by a vendor of the charging device. In that case, for example, the controller may have memory that stores an input set number. Alternatively, the set number may be determined by the controller. For example, the controller may set the set number in accordance with the information from an information acquiring section. In that case, for example, the controller may have memory storing a table in which the information and the set number are related to each other.

The charging device and the charging method of an aspect of the present disclosure can be used in, for example, power supplies for various mobile devices, a stationary power supply, and a vehicular power supply.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A charging device comprising:
a plurality of couplers that are respectively connectable to a plurality of secondary battery-equipped devices; and
control circuitry operative to:
charge, if a number of one or more secondary battery-equipped devices to be charged is smaller than a set number, each of the one or more secondary battery-equipped devices to be charged with a continuous current, wherein the one or more secondary battery-equipped devices to be charged are respectively connected to one or more couplers of the plurality of couplers; and
intermittently repeat, if the number of the one or more secondary battery-equipped devices to be charged is greater than or equal to the set number, charging of each of the one or more secondary battery-equipped devices to be charged with a stopping interval placed between charging operations while selectively and sequentially switching the one or more secondary battery-equipped devices to which a charging current is supplied at a same time, wherein the charging current is increased and an application duration of the charging current per charging is shortened with an increase in the number of the one or more secondary battery-equipped devices to be charged.

2. The charging device according to claim 1, wherein the set number is 2, and if the number of the one or more secondary battery-equipped devices to be charged is 2 or more, one secondary battery-equipped device is being charged while the other secondary battery-equipped device is in the stopping interval.

3. The charging device according to claim 1, wherein if the number of the one or more secondary battery-equipped devices to be charged is greater than or equal to the set number, the control circuitry lengthens the stopping interval with an increase in the number of the one or more secondary battery-equipped devices to be charged.

4. The charging device according to claim 1, wherein the control circuitry keeps a time average of the charging current expressed as $I \times TC/(TC+TP)$ constant irrespective of an increase in the number of the one or more secondary battery-equipped devices to be charged, where TC is the application duration of the charging current, I is a magnitude of the charging current, and TP is the stopping interval.

5. The charging device according to claim 4, wherein the time average of the charging current is equal to the continuous current.

6. The charging device according to claim 1, wherein if the number of the one or more secondary battery-equipped devices to be charged is increased during the application duration, the control circuitry increases the charging current and shortens the application duration before the application duration is ended.

7. The charging device according to claim 1, wherein the control circuitry keeps an amount of charging electricity or an amount of charging electric power per charging constant in each of the one or more secondary battery-equipped devices to be charged irrespective of the number of the one or more secondary battery-equipped devices to be charged.

8. The charging device according to claim 7, wherein the control circuitry makes the one or more secondary battery-equipped devices to be charged equal to each other in at least one of a magnitude of the charging current and the application duration of the charging current.

9. The charging device according to claim 1, wherein the control circuitry makes the application duration of the charging current longer for the secondary battery-equipped device to be charged with higher full charging capacity thereof.

10. The charging device according to claim 1, wherein the plurality of couplers each includes wireless power feeder.

11. The charging device according to claim 1, further comprising:
an information acquirer operative to:
acquire information on a secondary battery from each of the one or more secondary battery-equipped devices to be charged; and
send the information to the control circuitry,
wherein the control circuitry is further operative to determine a charging condition based on the information.

12. The charging device according to claim 1, further comprising:
an electricity storage device operative to:
be charged when the number of the one or more secondary battery-equipped devices to be charged is smaller than a number of the plurality of couplers; and
supply power when the number of the one or more secondary battery-equipped devices to be charged is 2 or more.

13. A charging method comprising:
(a) detecting a number of one or more secondary battery-equipped devices to be charged;
(b) charging, if the number of the one or more secondary battery-equipped devices to be charged is smaller than a set number, each of the one or more secondary battery-equipped devices to be charged with a continuous current; and
(c) intermittently repeating, if the number of the one or more secondary battery-equipped devices to be charged is greater than or equal to the set number, charging of each of the one or more secondary battery-equipped devices to be charged with a stopping interval placed between charging operations while selectively and sequentially switching the one or more secondary battery-equipped devices to which a charging current is supplied at a same time, wherein
in the step (c), if an increase in the number of the one or more secondary battery-equipped devices to be charged is further detected, the charging current is increased and an application duration of the charging current per charging is shortened.

14. The charging method according to claim 13, wherein the set number is 2.

15. The charging method according to claim 13, wherein in the step (c), the stopping interval is increased with an increase in the number of the one or more secondary battery-equipped devices to be charged.

16. The charging method according to claim 13, wherein a time average of the charging current expressed as $I \times TC/(TC+TP)$ is kept constant irrespective of an increase in the number of the one or more secondary battery-equipped devices to be charged, where TC is the application duration of the charging current, I is a magnitude of the charging current, and TP is the stopping interval.

17. The charging method according to claim 13, wherein in the step (c), if an increase in the number of the one or more secondary battery-equipped devices to be charged is detected during the application duration, the charging current is increased and the application duration is shortened before the application duration is ended.

18. The charging method according to claim 13, wherein an amount of charging electricity or an amount of charging electric power per charging is kept constant in each of the one or more secondary battery-equipped devices to be charged irrespective of the number of the one or more secondary battery-equipped devices to be charged.

19. The charging method according to claim 13, wherein the one or more secondary battery-equipped devices to be charged are made equal to each other in at least one of a magnitude of the charging current and the application duration of the charging current.

20. The charging method according to claim 13, wherein the application duration of the charging current per charging is made longer for the secondary battery-equipped device to be charged with higher full charging capacity thereof.

* * * * *